United States Patent
Eijsbouts-Spickova et al.

(10) Patent No.: US 9,943,832 B2
(45) Date of Patent: Apr. 17, 2018

(54) BULK CATALYST COMPOSITION COMPRISING BULK METAL OXIDE PARTICLES

(75) Inventors: Sona Eijsbouts-Spickova, Nieuwkuijk (NL); Robertus Gerardus Leliveld, Utrecht (NL); Paul Joseph Maria Lebens, Woerden (NL); Frans Lodewijk Plantenga, Hoevelaken (NL); Bob Gerardus Oogjen, Almere (NL); Henk Jan Tromp, Utrecht (NL); Stuart Leon Soled, Pittstown, NJ (US); Sabato Miseo, Pittstown, NJ (US)

(73) Assignee: Albemarle Netherlands B.V. (NL)

( * ) Notice: Subject to any disclaimer, the term of this patent is extended or adjusted under 35 U.S.C. 154(b) by 942 days.

(21) Appl. No.: 12/743,153

(22) PCT Filed: Dec. 4, 2008

(86) PCT No.: PCT/US2008/085536
§ 371 (c)(1),
(2), (4) Date: May 14, 2010

(87) PCT Pub. No.: WO2009/073785
PCT Pub. Date: Jun. 11, 2009

(65) Prior Publication Data
US 2010/0248945 A1    Sep. 30, 2010

Related U.S. Application Data

(60) Provisional application No. 61/005,248, filed on Dec. 4, 2007.

(51) Int. Cl.
*B01J 23/888*    (2006.01)
*B01J 23/85*    (2006.01)
(Continued)

(52) U.S. Cl.
CPC ........... *B01J 23/8885* (2013.01); *B01J 23/85* (2013.01); *B01J 23/888* (2013.01); *B01J 37/03* (2013.01);
(Continued)

(58) Field of Classification Search
None
See application file for complete search history.

(56) References Cited

U.S. PATENT DOCUMENTS 4,113,658 A    9/1978    Geus
4,257,874 A    3/1981    Bergna
(Continued)

FOREIGN PATENT DOCUMENTS

WO    WO 1985/003239    8/1985
WO    WO 1996/007477    3/1996
(Continued)

OTHER PUBLICATIONS

General Synthesis of a Mesoporous Composite of Metal Oxide and Silicate Nanoparticles From a Metal Salt and Laponite Suspension for Ctalysis. Zhu et al. (Chem. Mater. 2006, 18, 3993-4001.*

*Primary Examiner* — Melvin C Mayes
*Assistant Examiner* — Colette Nguyen
(74) *Attorney, Agent, or Firm* — Nathaniel C. Dunn; Jeremy J. Kliebert; Marcy M. Hoefling

(57) ABSTRACT

The invention relates to a process for preparing bulk metal oxide particles comprising the steps of combining in a reaction mixture (i) dispersible nanoparticles having a dimension of less than about 1 μm upon being dispersed in a liquid, (ii) at least one Group VIII non-noble metal compound, (iii) at least one Group VIB metal compound, and (iv) a protic liquid; and reacting the at least one Group VIII non-noble metal compound and the at least one Group VIB metal in the presence of the nanoparticles. It also relates (Continued)

to bulk metal hydroprocessing catalysts obtainable by such method.

18 Claims, 2 Drawing Sheets

(51) Int. Cl.
    *B01J 37/03*     (2006.01)
    *B01J 37/20*     (2006.01)
    *C10G 49/04*     (2006.01)
    *B01J 21/16*     (2006.01)
    *B01J 35/00*     (2006.01)
    *B01J 37/00*     (2006.01)

(52) U.S. Cl.
    CPC .............. *B01J 37/20* (2013.01); *C10G 49/04* (2013.01); *B01J 21/16* (2013.01); *B01J 35/002* (2013.01); *B01J 37/0009* (2013.01)

(56) References Cited

U.S. PATENT DOCUMENTS

| | | | |
|---|---|---|---|
| 2002/0010088 A1* | 1/2002 | Eijsbouts | B01J 23/85 502/313 |
| 2004/0241427 A1* | 12/2004 | Zhu | B01J 20/10 428/328 |
| 2006/0106268 A1 | 5/2006 | Kawaleski | |
| 2007/0084754 A1 | 4/2007 | Soled et al. | |
| 2008/0020926 A1* | 1/2008 | Guillaume et al. | 502/314 |

FOREIGN PATENT DOCUMENTS

| | | | |
|---|---|---|---|
| WO | WO00/0041811 | * | 7/2000 |
| WO | WO 2000/041811 | | 7/2000 |
| WO | WO 2007/048594 | | 5/2007 |

* cited by examiner

BULK CATALYST COMPOSITION COMPRISING BULK METAL OXIDE PARTICLES

REFERENCE TO RELATED APPLICATION

This application is the National Stage of International Patent Appl. No. PCT/US2008/085536, filed on Dec. 4, 2008, which claims priority on U.S. Provisional Application No. 61/005,248 filed on Dec. 4, 2007, the disclosures of which are incorporated herein by reference.

TECHNICAL BACKGROUND OF THE INVENTION

The invention relates to a bulk catalyst composition, in particular a hydroprocessing bulk catalyst composition, and a process for its preparation of, wherein the bulk catalyst composition comprises bulk metal oxide particles having at least one Group VIII non-noble metal, at least one Group VIB metal, and dispersible nanoparticles.

DESCRIPTION OF THE PRIOR ART

The hydroprocessing of hydrocarbon feedstocks generally encompasses all processes in which a hydrocarbon feedstock is reacted with hydrogen in the presence of a catalyst and under hydroprocessing conditions, typically, at elevated temperature and elevated pressure. The term hydroprocessing includes, but is not limited to, processes such as hydrogenation, hydrodesulfurization, hydrodenitrogenation, hydrodemetallization, hydrodearomatization, hydroisomerization, hydrodewaxing, hydrocracking and mild hydrocracking.

In general, conventional hydroprocessing catalysts are composed of a carrier (or support) with a Group VIB metal component and a Group VIII non-noble metal component deposited thereon. Such catalysts may be prepared by impregnating a carrier with aqueous solutions of compounds of the desired metals, followed by one or more drying and/or calcination steps.

Alternative techniques for the preparation of the "supported" catalysts are described in U.S. Pat. No. 4,113,605—where inter alia nickel carbonate is reacted with $MoO_3$ to form crystalline nickel molybdate, which is subsequently mixed and extruded with alumina—and in German Patent No. DE 3029266, where nickel carbonate is mixed with $WO_3$ and the resulting composition is mixed with alumina impregnated with compounds such as nickel nitrate and ammonium tungstate.

A significant amount of attention has recently been directed to the provision of catalysts, which can be applied without a carrier, generally referred to as bulk catalysts. WO 99/03578 describes a method for the preparation of bulk hydroprocessing catalysts compositions comprising bulk metal oxide particles having one Group VIII non-noble metal and two Group VIB metals by reacting and co-precipitating nickel, molybdenum, and tungsten compounds in the absence of sulfides.

WO 00/41810 describes a method for the preparation of a hydroprocessing catalyst comprising bulk metal oxide particles wherein one or more Group VIII non-noble metal and two or more Group VIB metals are reacted in a protic liquid, wherein the metal compounds are at least partly in the solute state (i.e., dissolved) during the reaction. The prior art also discloses producing the hydroprocessing catalyst in a convenient form for use in a hydroprocessing process by shaping, for example by extrusion, and by compositing the obtained bulk metal oxide particles with small quantities of further materials, for example binder material, to facilitate shaping and to provide mechanical strength to a shaped catalyst.

Although the bulk catalyst compositions described in the prior art have an excellent hydroprocessing activity, there exists a continuous need in the art to develop novel bulk catalyst compositions with further improved hydroprocessing activity, in particular, in hydrodesulfurisation (HDS), as well as hydrodenitrogenation (HDN), and hydrogenation of particular target hydrocarbon feedstocks, such as diesel and vacuum gas oil (VGO).

For instance, WO 00/41810 describes bulk catalysts having bulk metal oxide particles comprising at least one Group VIII metal and at least 2 Group VIB metals with varying ratios of Group VIII to Group VIB metals. The examples describe that increasing hydrodesulfurisation (HDS) activity is obtained at increasing molar ratios of Group VIII metal over Group VIB metals. This document indicates in particular that, for bulk metal catalysts having one Group VIII metal and one Group VIB metal, it is very difficult to obtain a suitably active catalyst at a Group VIII to Group VIB metal molar ratio below 1.25. Furthermore, at metal molar ratios below about 1.1 to 1, a completely different crystal structure is obtained that was not active at all. From a theoretical point of view, it is believed that such large amounts of Group VIII metal, although advantageous or even necessary in the process of the preparation of the catalyst, may not be necessary, or not fully necessary, in the active sulfided bulk catalyst employed in the hydrotreatment of a hydrocarbon feedstock. While high Group VIII to Group VIB metal molar ratios appear to be useful during catalyst synthesis, excessive amounts of Group VIII metals seem to only add unnecessary weight and to reduce the activity per unit weight of the bulk catalyst composition once the bulk metal oxide particles are sulfided. Thus, there is a desire to find higher activity catalyst, in particular for bulk catalysts comprising at least one Group VIII and at least one Group VIB metal that can be produced with low Group VIII to Group VIB metal molar ratios.

SUMMARY OF THE INVENTION

Accordingly, a bulk catalyst composition is provided comprising bulk metal oxide particles having (i) dispersible nanoparticles having a dimension of less than about 1 μm upon being dispersed in a liquid, (ii) at least one Group VIII non-noble metal compound, and (iii) at least one Group VIB metal compound; as well as a process for preparing such bulk metal oxide particles comprising the steps of combining in a reaction mixture (i) dispersible nanoparticles having a dimension of less than about 1 μm upon being dispersed in a liquid, (ii) at least one Group VIII non-noble metal compound, (iii) at least one Group VIB metal compound, and (iv) a protic liquid; and reacting the at least one Group VIII non-noble metal compound and the at least one Group VIB metal compound.

The process preferably comprises: (a) preparing a first suspension of at least one Group VIII non-noble metal compounds in a protic liquid; (b) preparing a second suspension of at least one Group VIB metal compounds in a protic liquid and (c) adding the first and second suspensions together, wherein at least one of the first or second suspensions comprises dispersible nanoparticles having a dimension of less than about 1 μm upon being dispersed in a liquid. More preferably, at least a portion of the nanoparticles is included in the first suspension of the Group VIII non-noble metal compound. Most preferably, at least a portion of the nanoparticles is included in a first suspension that comprises at least one of nickel carbonate, nickel hydroxy-carbonate, cobalt carbonate and cobalt hydroxy-carbonate.

In one embodiment, the Group VIB or VIII metal compound is prepared by precipitation in the presence of the nanoparticles. Preferably, nickel (hydroxy-) carbonate and cobalt (hydroxy-) carbonate are prepared by precipitation in the presence of nanoparticles, preferably of synthetic clay mineral.

This process can also be used to make bulk metal oxide particles comprising at least one Group VIII non-noble metal compound and at least two Group VIB metal compounds.

In another embodiment of the process according to the invention, the reaction mixture further comprises a Group V metal compound, preferably a niobium compound. The Group V metal has been found to promote, even when present in relatively low amounts, the formation of an active catalyst especially in critical composition ranges, for example at low Group VIII to Group VIB metal molar ratio. The term "active catalyst" means a catalyst having a high HDS and/or HDN activity.

This invention is also directed to a bulk catalyst composition comprising bulk metal oxide catalyst particles comprising at least one Group VIII non-noble metal, at least one Group VIB metal and dispersible nanoparticles having a dimension of less than about 1 μm upon being dispersed in a liquid, obtainable by the process according to the invention. Further, in accordance with another aspect of the invention there is provided a bulk catalyst composition comprising bulk metal oxide catalyst particles which comprise at least one Group VIII non-noble metal and at least one Group VIB metal, said Group VIII and Group VIB metals representing from about 50 wt. % to about 99.5 wt. %, calculated as oxides, of the total weight of the bulk catalyst composition, the metals being present in the bulk catalyst composition in their oxidic state and/or their sulfidic state, and from about 0.5 wt. % to about 15 wt. % (based of the total weight of the bulk metal oxide catalyst particles) of nanoparticles. The invention further relates to a sulfided bulk catalyst obtainable by sulfiding the above described bulk catalyst composition comprising bulk metal oxide catalyst particles.

Within the bulk catalyst composition it is preferred that the bulk metal oxide catalyst particles preferably comprise: i) from about 50 wt. % to about 99.5 wt. %, more preferably from about 70 wt. % to about 99 wt. %, and most preferably from about 85 wt. % to about 95 wt. % of said Group VIII non-noble metals and Group VIB metals, calculated as oxides based of the total weight of the bulk catalyst composition, the metals being present in their oxidic and/or sulfidic states; and, ii) from about 0.5 wt. % to about 15 wt. %, preferably from about 1 to about 10 wt. %, more preferably from about 1 to about 5 wt. % and even more preferably from about 2 to about 4 wt. % (based of the total weight of the bulk metal oxide catalyst particles) of nanoparticles. Considering that particles always have a particle size distribution, it is preferred that at least about 50 wt. %, preferably at least about 70 wt % of the total amount of added nanoparticles have a lateral dimension of less than about 1 μm.

In accordance with another aspect of the invention there is provided a process for the hydroprocessing of a hydrocarbon feedstock wherein the feedstock is contacted under hydroprocessing conditions with the aforementioned bulk catalyst composition. The bulk catalyst composition according to this invention can be used in virtually all hydroprocessing processes to treat a plurality of feedstocks under wide-ranging reaction conditions, including but not limited to pre-treating a feedstock prior to its being hydrocracked. Generally, these reaction conditions comprise a temperature in the range from about 200° to about 450° C., hydrogen pressures in the range from about 5 to about 300 Bar, liquid hourly space velocities (LHSV) in the range from about 0.5 to about 10 $h^{-1}$ and $H_2$/oil ratios in the range from about 50 to about 2000 Nl/l. However, it is preferred to employ the catalyst of the present invention in the hydroprocessing of, and more particularly, the hydrodesulfurisation (HDS), hydrodenitrogenation (HDN) and hydrodearomatization (HDA) of feedstocks comprising a diesel oil or a vacuum gas oil under conditions at least comprising liquid hourly space velocities (LHSV) in the range from about 0.5 to about 10 $h^{-1}$ and $H_2$/oil ratios in the range from about 50 to about 2000 Nl/l. The bulk catalyst composition has been found to show improved hydrodesulfurisation activity under conditions wherein the feedstock has a low nitrogen level, in particular in VGO. One preferred embodiment of the invention is as a catalyst for the pre-treatment of a feedstock prior to it being hydrocracked.

DETAILED DESCRIPTION OF THE INVENTION

Figure 1:
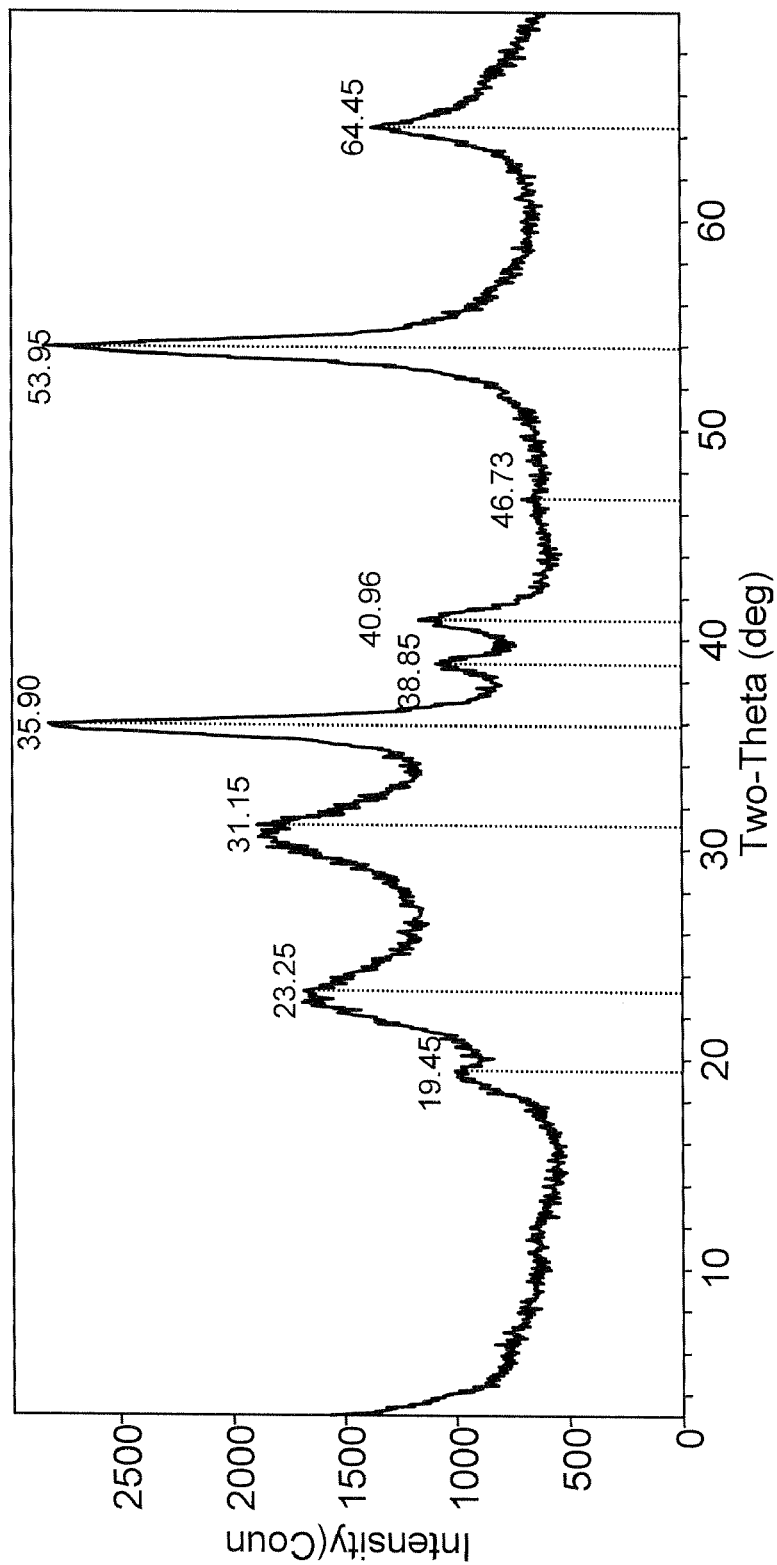
FIG. 1 is an X-ray diffraction pattern of a bulk catalyst composition according to the present invention.

It has been found that a bulk catalyst composition comprising bulk metal particles prepared by combining and reacting, in the presence of dispersible nanoparticles having a dimension of less than 1 μm in its dispersed state, at least one Group VIII non-noble metal compound with at least one Group VIB metal compound in a reaction mixture with a protic liquid have many advantages over corresponding catalysts comprising bulk metal particles prepared without the nanoparticles. For example, it was found that bulk metal catalysts prepared with nanoparticles having a dimension of less than 1 μm in their dispersed state provide catalysts having a significantly higher hydroprocessing activity than the same catalyst prepared without such nanoparticles in the reaction mixture. Further, the desired highly active metal oxide bulk particle structure is formed in a significantly shorter time than in the absence of the nanoparticles, even at low Group VIII to Group VIB metal molar ratios.

The various embodiments relating to these findings are described below in further detail.

Compounds and Materials

Nanoparticles

Since the mixed metal oxide/sulfide particles formed during the catalyst preparation process can also be nanoparticles, the term nanoparticles as used herein does not refer to metal oxide nanoparticles that may form during the catalyst synthesis process, but to other nanoparticles deliberately added to the reaction mixture used to synthesize the mixed metal oxide particles. In a preferred embodiment, the nanoparticles are clay mineral nanoparticles, preferably synthetic clay mineral nanoparticles, having a dimension of less than about 1 µm. More preferably, the nanoparticles have a largest dimension, in three coordinate space, of less than about 1 µm, preferably less than 500 nm, more preferably less than 250 nm, and even more preferably less than 100 nm. The nanoparticles preferably have a smallest dimension, in three coordinate space, of less than 25 nm, preferably less than 10 nm, even more preferably less than 5 nm, and even more preferably less than 1 nm. A nanoparticle's dimensions can be determined by TEM, light scattering methods, or equivalent methods known in the art, as described hereafter. Conveniently, at least 50 wt. %, such as at least 70 wt. % of the nanoparticles have a largest dimension of less than about 1 µm.

In addition to definitions described above, the term "nanoparticles" as used herein encompasses particles of any shape having appropriate dimensions and, as such, include spherical, polyhedral, nanofiber and disc-like nanoparticles.

Preferably the nanoparticles used in the present invention are clay minerals, more preferably synthetic clay minerals, that can provide disc-like nanoparticles when dispersed in the protic liquid of the invention and which thus present a flat or quasi-flat surface during the reaction of the metal compounds which form the bulk metal oxide particles. More preferably clay minerals, which can provide disc-like particles having a surface area greater than about 250 m$^2$/g, most preferably greater than about 350 m$^2$/g are desirable. Such clay minerals include synthetic 2:1 type clays and natural and synthetic layered silicic acids. The nanoparticles are preferably a clay mineral selected from the group consisting of synthetic clays of the smectite family, layered silicic acids, kaolinite, laponite, halloysite and mixtures thereof.

Synthetic 2:1 types clays suitable for inclusion in this invention—such as fluorohectorite, laponite and fluoromicas—include those of the smectite family with the crystal structure consisting of nanometer thick sheets of aluminium (Al) octahedra sandwiched between two silicon (Si) tetrahedron sheets. These three-sheet layers are stacked with a van de Waals gap between the layers. Isomorphic substitution of Al with magnesium (Mg), iron (Fe) or lithium (Li) in the octahedra sheets and/or Si with Al in the tetrahedron sheets gives each three sheet layer an overall negative charge which is counterbalanced by exchangeable metal cations in the interlayer space such as sodium (Na), calcium (Ca), Mg, Fe and Li.

Synthetic layered silicic acids suitable for inclusion in this invention—such as kanemite, makatite, octasilicate, magadite and kenyaite—are clays that consist mainly of silicon tetrahedron sheets with different layer thickness. They exhibit similar intercalation chemistry to the aforementioned smectites; furthermore, as they possess high purity and structural properties that are complimentary to these smectite clays, this facilitates their use in combination with said smectites.

The intercalation chemistry of both the synthetic smectite clays and the synthetic layered silicic acids allows them to be chemically modified to be compatible with the further metal compounds of the bulk catalyst composition.

Synthetic 2:1 type clays and layered silicic acids are typically available commercially as powders. These powder minerals and other clays are preferably exfoliated and/or delaminated into disc-like nanoparticles before use in the process according to the invention. Preferably this is carried out by dispersion of the powders in a liquid, preferably water, for a sufficiently long period of time to exfoliate and/or delaminate into disc-like nanoparticles. Without wishing to be bound by theory, the formation of disc-like nanoparticles from such powders is believed to occur by the following process: i) a wetting of the powders to form aggregated particle stacks, each stack being analogous to a column of coins with each coin being a layer of the clay structure; ii) dispersion of said aggregated stacks into individual particle stacks ("secondary particles"); iii) hydration of intercalated sodium ions within the stacks; and iv) separation into individual particles ("primary particles").

It is to be noted that both the non-aggregated individual stacks (secondary particles) and the primary particles can be nanoparticles within the meaning of this invention. The primary particles of these disc-shaped clay minerals are generally characterized by a thickness ranging from about 0.1 and about 1.5 nm, a lateral dimension of less than about 100 nm, an aspect ratio of about 100 to about 1500 and surface areas greater than about 250 m$^2$/g. However, it is desirable in the present invention to use clays which can be provided as—or delaminated/exfoliated into—primary and secondary particles which are characterized by a surface area ranging from about 350 to about 1000 m$^2$/g, and wherein the (constituent) primary particles have a thickness of about 1 nm, and a lateral dimension of less than about 100 nm.

As such, it is preferred in the present invention that the nanoparticles comprise a synthetic clay of the smectite family. More preferably, the nanoparticles comprise greater than about 70 wt. %, preferably greater than about 90 wt. %, laponite, based on the total weight of the nanoparticles. Most preferably, the nanoparticles consist essentially of laponite.

The clay mineral nanoparticles may also be prepared as organoclays. Organoclays are manufactured by modifying clay with quaternary amines, a type of surfactant that contains a nitrogen ion. The nitrogen end of the quaternary amine, the hydrophilic end, is positively charged, and can be ion-exchanged for sodium or calcium. The amines used typically are of the long chain type with from about 12 to about 18 carbon atoms. If a certain minimum percentage, typically about 30% t, of the clay surface is coated with these amines, the clay becomes hydrophobic. With certain amines, the clay can be made organophilic.

Other Compounds and Materials

The process for the preparation of bulk catalysts according to the invention combines in a reaction mixture with a protic liquid, metal compounds and nanoparticles, and reacts the metals in the presence of the nanoparticles. The protic liquid can be any protic liquid which does not interfere with the reactions of the metal compounds or the dispersion of the nanoparticles. Examples include water, carboxylic acids, and alcohols such as methanol, ethanol or mixtures thereof. Preferred protic liquids are mixtures of water and other protic liquids, such as mixtures of an alcohol and water, and a more preferred protic liquid is water alone.

It will be evident that different protic liquids can be applied simultaneously in the process of this invention. For instance, it is possible to add a suspension of a metal compound in ethanol to an aqueous solution of another metal compound. In some cases, a metal compound can be used which dissolves in its own water of crystallization. The water of crystallization serves as protic liquid in this case.

At least one Group VIII non-noble metal compound and at least one Group VIB metal compound are used in the process of the invention. Suitable Group VIB metals include chromium, molybdenum, tungsten, or mixtures thereof, with a combination of molybdenum and tungsten being most preferred. Suitable Group VIII non-noble metals include iron, cobalt, nickel, or mixtures thereof, preferably cobalt and/or nickel. Preferably, a combination of metal compounds comprising either i) nickel and tungsten; ii) nickel and molybdenum; iii) nickel, molybdenum, and tungsten; iv) cobalt and tungsten; v) cobalt and molybdenum; vi) cobalt, molybdenum, and tungsten; or vii) nickel, cobalt, molybdenum and tungsten is used in the process of the invention.

In a preferred embodiment, nickel and cobalt make up at least about 50 wt. %, more preferably at least about 70 wt. %, still more preferably at least about 90 wt. % of the total of Group VIII non-noble metal compounds, calculated as oxides. It is even more preferred for the Group VIII non-noble metal compound to consist essentially of nickel and/or cobalt.

In another preferred embodiment, molybdenum and tungsten represent at least about 50 wt. %, more preferably at least about 70 wt. %, still more preferably at least about 90 wt. % of the total of Group VIB metal compounds, calculated as trioxides. It is even more preferred for the Group VIB metal compound to consist essentially of a mixture of molybdenum and tungsten.

The molar ratio of Group VIB metal to Group VIII non-noble metals applied in the process of the invention generally ranges from about 10:1 to about 1:10 and preferably ranges from about 3:1 to about 1:3. The molar ratio of the different Group VIB metals to one another generally is not critical. The same holds when more than one Group VIII non-noble metal is applied. When molybdenum and tungsten are used as Group VIB metals, the molybdenum:tungsten molar ratio preferably lies in the range of about 9:1 to about 1:19, more preferably about 3:1 to about 1:9, most preferably about 3:1 to about 1:6.

In another embodiment, the bulk catalyst according to the invention comprises a Group V metal, preferably niobium. Preferably, they Group V metal is present in an amount ranging from about 0.1 to about 10 mole % (relative to the total of the Group VIB metals), more preferably from about 0.1 to about 9 mole %, more preferably from about 0.1 to about 8, even more preferably from about 0.1 to about 7, and most preferably from about 0.1 to about 5 mole %. The Group V metal has been found to promote, even when present in relatively low amounts, the formation of an active catalyst especially in critical composition ranges, for example at low Group VIII to Group VIB metal molar ratio. The presence of a Group V metal, preferably niobium, is particularly preferred where the molar ratio of Group VIII metal over Group VIB metal is below about 1.5:1, even more preferred when it is below about 1.4:1, about 1.3:1, or even below about 1.2:1. Particularly preferred catalysts according to invention comprise Group VIII metals Co, Ni, or a mixture of Co and Ni, and Group VIB metals W, Mo, or a mixture of W and Mo, preferably only Ni and W, in a metal molar ratio below about 1.2:1, and further comprise between about 0.1 and about 5 mole % (relative to the total of the Group VIB metals, wherein all metals are expressed as oxides) of a Group V metal, preferably niobium, and about 0.5 to about 5 wt % (relative to the total weight of the bulk metal oxide particle) of a synthetic nanoclay, wherein the Group VIII, Group VIB and Group V metals form at least about 95 wt % (based on oxides) of the total of the metal compounds in the bulk catalyst particles and at least about 50 wt %, preferably at least about 70 wt % relative to the total weight of the bulk catalyst composition.

If the protic liquid is water, the solubility of the Group VIII non-noble metal compounds and Group VIB metal compounds which are at least partly in the solid state during the process of the invention generally is less than about 0.05 mol/100 ml water at 18° C. This may be contrasted with the high solubility of the selected compounds of, for example, GB 1 282 950.

If the protic liquid is water, suitable Group VIII non-noble metal compounds which are at least partly in the solid state during the process of the invention comprise Group VIII non-noble metal compounds with a low solubility in water such as citrates, oxalates, carbonates, hydroxy-carbonates, hydroxides, phosphates, phosphides, sulfides, aluminates, molybdates, tungstates, oxides or mixtures thereof. Preferably, Group VIII non-noble metal compounds which are at least partly in the solid state during the process of the invention comprise, and more preferably consist essentially of, oxalates, carbonates, hydroxy-carbonates, hydroxides, phosphates, molybdates, tungstates, oxides, or mixtures thereof, with hydroxy-carbonates and carbonates being most preferred. Generally, the molar ratio between the hydroxy groups and the carbonate groups in the hydroxy-carbonate lies in the range from 0 to about 4, preferably from 0 to about 2, more preferably from 0 to about 1 and most preferably from about 0.1 to about 0.8.

If the protic liquid is water, suitable nickel and cobalt compounds which are at least partly in the solid state during the process of the invention comprise slightly soluble nickel or cobalt or mixed nickel-cobalt compounds such as oxalates, citrates, aluminates, carbonates, hydroxy-carbonates, hydroxides, molybdates, phosphates, phosphides, sulfides, tungstates, oxides, or mixtures thereof. Preferably, the nickel or cobalt compound comprises, and more preferably consists essentially, of oxalates, citrates, carbonates, hydroxy-carbonates, hydroxides, molybdates, phosphates, tungstates, oxides, or mixtures thereof, with nickel and/or cobalt hydroxy-carbonate, nickel and/or cobalt hydroxide, nickel and/or cobalt carbonate, or mixtures thereof being most preferred. Generally, the molar ratio between the hydroxy groups and the carbonate groups in the nickel or cobalt or nickel-cobalt hydroxy-carbonate lids in the range of 0 to about 4, preferably 0 to about 2, more preferably 0 to about 1 and most preferably about 0.1 to about 0.8. Suitable iron compounds which are at least partly in the solid state are iron(II) citrate, iron carbonate, hydroxy-carbonate, hydroxide, phosphate, phosphide, sulfide, oxide, or mixtures thereof, with iron(II) citrate, iron carbonate, hydroxy-carbonate, hydroxide, phosphate, oxide, or mixtures thereof being preferred.

If the protic liquid is water, suitable low water-solubility Group VIB metal compounds which are thus at least partly in the solid state during contacting include di- and trioxides, carbides, nitrides, aluminium salts, acids, sulfides or mixtures thereof. Of this group, it is preferred that the Group VIB metal compounds consist essentially of, di- and trioxides, acids or mixtures thereof.

Suitable molybdenum compounds which are at least partly in the solid state during the process of the invention comprise water-insoluble molybdenum compounds such as molybdenum di- and trioxide, molybdenum sulfide, molybdenum carbide, molybdenum nitride, aluminium molybdate, molybdic acids (e.g. $H_2MoO_4$), ammonium phosphomolybdate, or mixtures thereof, with molybdic acid and molybdenum di- and trioxide being preferred.

Finally, suitable tungsten compounds which are at least partly in the solid state during the process of the invention comprise water-insoluble tungsten compounds, such as tungsten di- and trioxide, tungsten sulfide ($WS_2$ and $WS_3$), tungsten carbide, ortho-tungstic acid ($H_2WO_4*H_2O$), tungsten nitride, aluminium tungstate (also meta- or polytungstate), ammonium phosphotungstate, or mixtures thereof, with ortho-tungstic acid and tungsten di- and trioxide being preferred.

All the above compounds generally are commercially available or can be prepared by, for example, precipitation. In particular nickel hydroxy-carbonate can be prepared from a nickel chloride, sulfate, or nitrate solution by adding an appropriate amount of sodium carbonate. It is generally known to the skilled person to choose the precipitation conditions in such a way as to obtain the desired morphology and texture of the resultant precipitate, and more particularly to control the particle size (surface area) of the precipitate.

In general, metal compounds, which mainly contain C, O and/or H in addition to the metal, are preferred because they are less detrimental to the environment. Group VIII non-noble metal carbonates and hydroxy-carbonate are preferred metal compounds to be added at least partly in the solid state because when carbonate or hydroxy-carbonate is applied, $CO_2$ evolves and positively influences the pH of the reaction mixture. Further, because the carbonate is transformed into $CO_2$ and does not end up in that waste water, it is possible to recycle the waste water. Consequently, no washing step is necessary to remove undesired anions from the resulting bulk metal oxide particles.

Preferred Group VIII non-noble metal compounds to be added in the solute state comprise water-soluble Group VIII non-noble metal salts such as nitrates, sulfates, acetates, chlorides, formates, hypophosphites and mixtures thereof. Examples include water-soluble nickel and/or cobalt compounds, e.g., water-soluble nickel and/or cobalt salts such as nitrates, sulfates, acetates, chlorides, formates, or mixtures thereof of nickel and/or cobalt as well as nickel hypophosphite. Suitable iron compounds to be added in the solute state comprise iron acetate, chloride, formate, nitrate, sulfate, or mixtures thereof.

Suitable Group VIB metal compounds to be added in the solute state include water-soluble Group VIB metal salts such as normal ammonium or alkali metal monomolybdates and tungstates as well as water-soluble isopoly-compounds of molybdenum and tungsten, such as metatungstic acid, or water-soluble heteropoly compounds of molybdenum or tungsten further comprising, e.g., P, Si, Ni, or Co or combinations thereof. Suitable water-soluble isopoly- and heteropoly compounds are described in *Molybdenum Chemicals*, Chemical data series, Bulletin Cdb-14, February 1969 and in *Molybdenum Chemicals*, Chemical data series, Bulletin Cdb-12a-revised, November 1969. Suitable water-soluble chromium compounds include normal chromates, isopolychromates and ammonium chromium sulfate.

Preferred combinations of metal compounds are a Group VIII non-noble metal hydroxy-carbonate and/or carbonate, such as nickel or cobalt hydroxy-carbonate and/or carbonate, with a Group VIB metal oxide and/or a Group VIB acid, such as the combination of tungstic acid and molybdenum oxide, or the combination of molybdenum trioxide and tungsten trioxide, or a Group VIII hydroxy-carbonate and/or carbonate, such as nickel or cobalt hydroxy carbonate and/or carbonate, with Group VIB metal salts, such as ammonium dimolybdate, ammonium heptamolybdate, and ammonium metatungstate. It is considered that the skilled person would be able to select further suitable combinations of metal compounds.

Preparation of the Catalyst of the Invention (A) Preparation of Bulk Metal Oxide Particles An aspect of the present invention is directed to a process for preparing a bulk catalyst composition comprising bulk metal oxide catalyst particles comprising at least one Group VIII non-noble metal and at least one Group VIB metal, which process comprises combining and reacting at least one Group VIII non-noble metal compound with at least one Group VIB metal compound in a reaction mixture with a protic liquid: wherein the reaction occurs in the presence of dispersible nanoparticles, preferably nanoparticles of clay mineral, the nanoparticles being characterized by having a dimension of less than 1 µm when in its dispersed state.

Although it is possible for the process of this invention to be performed by combination and reaction of all metal components being in the solution state—as described in the disclosure of WO99/03578 which is herein incorporated by reference—it is preferred that at least one of the metal compounds remains at least partly in the solid state during the entire process. The term "at least partly in the solid state" as used herein means that at least part of the metal compound is present as a solid metal compound and, optionally, another part of the metal compound is present as a solution of this metal compound in the protic liquid. A typical example of this is a suspension of a metal compound in a protic liquid in which the metal is at least partly present as a solid, and optionally partly dissolved in the protic liquid. This aforementioned "entire process" comprises combining and reacting the metal compounds. More particularly, it comprises adding the metal compounds to each other and simultaneously and/or thereafter reacting them.

Without wishing to be bound by theory, it is believed that this reaction can even take place if all metal compounds are virtually completely in the solid state; due to the presence of the protic liquid a small fraction of the metal compounds can dissolve, interact and consequently react. The protic liquid is responsible for the transport of dissolved metal compounds and therefore the presence of a protic liquid during the process of the present invention is considered essential. The reaction time in this process is relatively long, preferably at least about 4 hours. However, due to the presence of nanoparticles the desired active structure is formed in a significantly shorter time than in the absence of the nanoparticles.

The embodiment of the invention wherein at least one metal compound is at least partly in the solid state during the process of the invention can take place in several ways. In this respect, it is considered, for example, that processes wherein i) a metal compound which is at least partly in solid state is combined with a metal compound which is in the solute state; ii) one of the metal compounds is added at least partly in the solid state and two metal compounds are added in the solute state; and iii) two metal compounds are added at least partly in the solid state to one metal compound in the solute state, are within the scope of this embodiment of the invention. With the term "in the solute state" is implied that the whole amount of this metal compound is added as a solution of this metal compound in the protic liquid. However, a fourth (iv) and preferred alternative is that all metal compounds to be combined in the process of the invention are applied at least partly in the solid state; this preferred embodiment reduces and ideally eliminates those anionic species (such as nitrate) and cationic species (such as ammonium ions) which are required for dissolution of the metal compounds in the protic liquid but which are not incorporated into the resultant mixed metal reaction product.

Within these alternatives all orders of addition of the metal compounds are possible. For example, that metal compound which is to remain at least partly in the solid state during the entire process may be prepared first as a suspension of the metal compound in a protic liquid to which added simultaneously or sequentially, solution(s) and/or further suspension(s) comprising dissolved and/or suspended further metal compound(s) in the protic liquid. Equally, it is also possible to first prepare a solution of a first metal component and then subsequently add the required suspension(s) of the partly solid state metal compound(s) and optionally further solution(s) either simultaneously or sequentially. However it is preferred that all Group VIII non-noble metal compounds are combined simultaneously and all Group VIB metal compounds are combined simultaneously and the resulting two mixtures are subsequently combined.

In all these cases, any suspension comprising a metal compound can be prepared by suspending a solid metal compound in the protic liquid. However, it is also possible to prepare the suspension by precipitating a solid metal compound in a protic liquid or (co)precipitating metal compounds where more than one metal compound is to remain at least partly in the solid state during the entire process. The further metal compounds may then be added directly in solution, in slurry or per se to the suspension resulting from this (co-) precipitation. Alternatively, the further metal compounds may be added:

i) to a dry precipitate or co-precipitate after that resulting precipitate has been treated by solid/liquid separation, followed by the optional steps of drying and/or thermally treating;

ii) to the precipitate of step i) above that has been wetted; or iii) to the precipitate of step i) or step ii) above that has been reslurried in a protic liquid.

Regardless of whether the metal components are combined and reacted in the solute state or combined and reacted with at least one metal compound being at least partly in the solid state, the reaction between the metal compounds must occur in the presence of nanoparticles. The nanoparticles are preferably combined with the metals as a suspension in an aqueous liquid. The nanoparticles may be added to solutions or suspensions of individual metal compounds prior to the combinations of said compounds with further metal compounds or to the suspensions/solutions of already combined metal compounds. It is preferred that the nanoparticles are admixed in a suspension of the or a metal compound which is to remain at least partly in the solid state during the entire process. Where that suspension of the metal compound has been prepared by precipitation it is further preferred that the precipitation occurs in the presence of the nanoparticles, preferably of synthetic clay mineral nanoparticles.

In accordance with an embodiment of the invention, at least a fraction and preferably all of the nanoparticles to be added are included in a suspension of nickel and/or cobalt hydroxy-carbonate or carbonate. More preferably these nickel and/or cobalt compounds have been prepared by the aforementioned precipitation reactions.

Without wishing to be bound by theory, the nanoparticles may act as nuclei on which the metal compound, preferably nickel and/or cobalt (hydroxyl-) carbonate, precipitates. The nanoparticles and the nickel and/or cobalt compounds formed during the reaction are thus intimately associated during formation of the bulk metal particles.

Preferably, at least about 1 wt. %, even more preferably at least about 10 wt. %, and still more preferably at least about 15 wt. % of a metal compound is added in the solid state during the process of the invention, based on the total weight of all Group VIB and Group VIII non-noble metal compounds, calculated as metal oxides. When it is desired to obtain a high yield, that is a high amount of the bulk metal oxide particles, the use of metal compounds of which a high amount remains in the solid state during the process of the invention may be the preferred method. In that case, low amounts of metal compounds remain dissolved in the mother liquid and the amount of metal compounds ending up in the waste water during the subsequent solid-liquid separation is decreased. Any loss of metal compounds can be avoided completely if the mother liquid resulting from solid-liquid separation is recycled in the process of the present invention. It is noted that it is a particular advantage of the process of the present invention that, compared to a catalyst preparation based on a co-precipitation process—where anions and cations like ammonium can accumulate in the mother liquor—the amount of waste water can be considerably reduced.

In a preferred process the at least one, preferably all metal compound remains at least partly in the solid state during the process of the invention. Because in this embodiment the reactivity is not very high, it is preferred that the compounds are slightly soluble. Depending on the reactivity of the metal compounds, preferably at least about 0.01 wt. %, more preferably at least about 0.05 wt. %, and most preferably at least about 0.1 wt. % of all metal compounds initially employed in the process of the invention are in dissolved state in reaction conditions (based on the total weight of all metal compounds, calculated as metal oxides). In this way, proper contacting of the metal compounds is ensured.

It has been found that the morphology and the texture of the metal compound(s), which remain at least partly in the solid state during the process of the invention, can be retained to some extent during the process of the present invention. Consequently, by using metal compound particles with a certain morphology and texture, the morphology and the texture of the bulk metal oxide particles contained in the final bulk catalyst composition can be controlled at least to some extent. "Morphology and texture" in the context of the present invention refer to pore volume, pore size distribution, surface area, particle form and particle size. Morphologic properties can be preserved by keeping at least a part of the raw material at least partly in the solid state means, for example by controlling the acidity (pH), for example by reducing the addition of acid such that not all of the metal species dissolve (e.g., when Ni carbonate, Mo oxide or tungstic acid is used).

Generally the surface area of the bulk metal, oxide particles is at least about 60%, preferably at least about 70%, and more preferably at least about 80% of the surface area of the metal compound which remains at least partly in the solid state during the process of the invention. The surface area is expressed herein as surface area per weight of this metal compound, calculated as metal oxide. Further, the median pore diameter (determined by nitrogen adsorption) of the oxidic bulk metal particles is at least about 40% and preferably at least about 50% of the median pore diameter of the metal compound which remains at least partly in the solid state during the process of the invention. Furthermore, the pore volume (determined by nitrogen adsorption) in the oxidic metal particles generally is at least about 40% and preferably at least about 50% of the pore volume of the metal compound which remains at least partly in the solid state during the process of the invention, with the pore volume being expressed herein as the volume of pores per weight of this metal compound, calculated as metal oxide.

The retention of the particle size generally is dependent on the extent of mechanical damage undergone by the oxidic bulk metal particles during processing, especially during steps such as mixing or kneading. The particle diameter can be retained to a high extent if these treatments are short and gentle. In this case, the median particle diameter of the oxidic bulk metal particles generally is at least about 80% and preferably at least about 90% of the median particle diameter of the metal compound which remains at least partly in the solid state during the process of the invention. The particle size can also be affected by treatments such as spray-drying, especially if further materials are present. It is within the capability of the skilled person to select suitable conditions in order to control the particle size distribution during such treatments.

When a metal compound which is added at least partly in the solid state and which has a large median particle diameter is selected, it is thought that the other metal compounds will only react with the outer layer of the large metal compound particle. In this case, so-called "core-shell" structured bulk metal oxide particles result (which will be described in greater detail hereinbelow).

An appropriate morphology and texture of the metal compound(s) can be achieved either by applying suitable preformed metal compounds or by preparing these metal compounds by means of the above-described precipitation or re-crystallization or any other technique known by the skilled person under such conditions that a suitable morphology and texture are obtained. A proper selection of appropriate precipitation conditions can be made by routine experimentation.

To obtain a final bulk catalyst composition with high catalytic activity, it is preferred that the metal compound or compounds which are at least partly in the solid state during the process of the invention are porous metal compounds. It is desired that the total pore volume and the pore size distribution of these metal compounds are broadly similar to those of conventional hydroprocessing catalysts. Conventional hydroprocessing catalysts generally have a pore volume of about 0.05 to about 5 ml/g, preferably of about 0.1 to about 4 ml/g, more preferably of about 0.1 to about 3 ml/g, and most preferably of about 0.1 to about 2 ml/g, as determined by mercury or water porosimetry. Further, conventional hydroprocessing catalysts generally have a surface area of at least about 10 m$^2$/g, more preferably of at least about 50 m$^2$/g, and most preferably of at least about 100 m$^2$/g, as determined via the B.E.T. method.

The median particle diameter of the metal compound or compounds which are at least partly in the solid state during the process of the invention is preferably is in the range from about 0.5 μm to about 5000 μm, more preferably from about 1 μm to about 500 μm, and most preferably from about 2 μm to about 150 μm. Generally, the smaller the particle size of the metal compounds, the higher their reactivity; in principle metal compounds with particle sizes below the aforementioned preferred lower limits would be desirable embodiments of the present invention but for health, safety, and environmental reasons, the handling of such small particles requires special precautions and is thus not preferred.

Because of the presence of nano-sized particles during the preparation of the bulk metal particles, the particle size distribution and the pore size distribution of the bulk metal particles shifts towards smaller particle diameters, compared to bulk metal particles prepared in the absence of such nanoparticles. Preferably the catalyst composition has a pore size distribution wherein at least 75 percent of the total pore volume is in pores of diameter from about 20 angstroms below the mode pore diameter to about 20 angstroms above the mode pore diameter, less than 10 percent of said total pore volume is in pores of diameter less than 60 angstroms and greater than 3 percent to less than 10 percent of said total pore volume is in pores of diameter greater than 110 angstroms, and said mode pore diameter of said composition is in the range from about 70 to about 90 angstroms.

Typically, the surface area increases as a result of the presence of the nanoparticles by at least 20%, more preferably at least 30%, even more preferably at least 50%. Also the pore volume decreases with nanoparticle addition. The pore diameter has been found to decrease by more than 20%, or even more than 30%, or more than 50%, when nanoparticles are used during preparation of the bulk multimetallic particles. Preferably however, for VGO hydrotreatment, the mean pore diameter (MPD) should not decrease below a value of about 7 nm to retain sufficiently high catalyst performance. In view of this effect and the fact that the activity improvement appears to level off at high nanoparticle content, the amount of nanoparticles added to the reaction mixture is preferably less than about 10 wt. %, relative to the total amount of metals used, calculated as metal oxides.

In the following, preferred process conditions during the combination of the metal compounds and the (subsequent) reaction step will be described:

Combination of the Metal Compounds

The process conditions during the combination of the metal compounds generally are not critical. It is possible to add all compounds at ambient temperature at their natural pH (if a suspension or solution is applied). Generally, it is preferred to keep the temperature of the added metal compounds below the atmospheric boiling point of the reaction mixture to ensure easy and safe handling of the compounds during the addition. However, if desired, temperatures above the atmospheric boiling point of the reaction mixture or different pH values may be applied. If the reaction step is carried out at increased temperature, the suspensions and optionally solutions, which are added to the reaction mixture, generally can be pre-heated to an increased temperature, which can be equal to the reaction temperature.

As has been mentioned above, the addition of one or more metal compounds can also be carried out while already combined metal compounds react with each other. In this case, the combination of the metal compounds and the reaction thereof overlap and constitute a single process step.

Reaction Step

The reaction can be monitored by conventional techniques such as IR spectroscopy or Raman spectroscopy, wherein the reaction is indicated by signal changes. In some cases, it is also possible to monitor the reaction by monitoring changes in the pH of the reaction mixture. Further, the completeness of the reaction can be monitored by X-ray diffraction. This will be described in more detail under the heading "Bulk catalyst composition of the invention."

During and/or after their addition, the metal compounds together with the nanoparticles, preferably the clay mineral nanoparticles, are agitated at a certain temperature for a period of time to allow the reaction to take place. The reaction temperature is preferably in the range of about 0° to about 300° C., more preferably about 50° to about 300° C., even more preferably about 70° to about 200° C., and most preferably in the range of about 70° to about 180° C. If the temperature is below the atmospheric boiling point of the reaction mixture, the process generally is carried out at atmospheric pressure. Above this temperature, the reaction generally is carried out at increased pressure, preferably in an autoclave and/or static mixer.

Typically, the mixture is kept at its natural pH during the reaction step; said pH is preferably in the range of about 0 to about 12, more preferably in the range of about 1 to about 10, and even more preferably in the range of about 3 to about 8. As has been set out above, it is preferred that the pH and the temperature are chosen in such a way that not all the metals are dissolved during the reaction step.

The reaction time may lie in the range of about 1 minute to several days depending on the reaction route chosen, but will generally range from about 1 minute to about 100 hours. In the process wherein at least one of the metal compounds is at least partly in the solid state during the reaction, preferably about 1 hour to about 30 hours, more preferably about 4 to about 30 hours, even more preferably about 10 to about 25 hours and more preferably about 15 hours to about 25 hours. As has been mentioned above, the reaction time depends on the temperature.

After the reaction step, if necessary, the solid can be separated from any protic liquid that may remain using, for example filtration. The process of the present invention can be carried out both as a batch process and as a continuous process.

(B) Subsequent Process Steps

It is noted that the bulk metal particles resulting from the process described above under (A) are metal oxide particles Following the process described above under (A), the bulk metal particles may be subjected to one or more of the following process steps before being used in hydroprocessing processes:

i) compositing with further materials selected from the group of binder materials, binder precursor materials, conventional hydroprocessing catalysts, cracking compounds, phosphorus-containing compounds, boron-containing compounds, silicon-containing compounds, fluorine-containing compounds, additional transition metals, rare earth metals or mixtures thereof, ii) spray-drying, (flash) drying, milling, kneading, slurry-mixing, dry or wet mixing, or combinations thereof, iii) shaping, (iv) drying and/or thermally treating, and (v) sulfiding.

The listing of these process steps as (i) to (v) is for convenience only; it is not a statement that these processes are constrained to be performed in this order. These process steps will be explained in more detail in the following:

Process Step (i)

The aforementioned further compositing materials can be performed at a plurality of stages during the preparation of the bulk metal particles. However, because any addition of further materials should not affect the interaction between the metal compounds and the nanoparticles, it is preferred that the Group VIB, Group VIII non-noble metal compounds and the nanoparticles are combined and preferably at least partly reacted to bulk metal particles before being combined with these further materials.

These materials can be added in the dry state, either thermally treated or not, in the wetted and/or suspended state and/or as a solution. They may be added prior to any step (ii) and/or during and/or subsequent to any step (ii) but preferably prior to a final shaping step (iii). Further additives may be added, for example by impregnation, after shaping (these are not referred to as further compositing materials)

Preferably, the material is added subsequent to the preparation of the bulk metal particles and prior to spray-drying or any alternative technique, or, if spray-drying or the alternative techniques are not applied, prior to shaping. Optionally, the bulk metal particles prepared as described above can be subjected to a solid-liquid separation before being composited with the material. After solid-liquid separation, optionally, a washing step can be included. Further, it is possible to thermally treat the bulk catalyst particles after an optional solid-liquid separation and drying step and prior to its being composited with the material.

In all the above-described process alternatives, the term "compositing the bulk metal particles with a material" means that the material is added to the bulk metal particles or vice versa and the resulting composition is mixed. Mixing is preferably done in the presence of a liquid ("wet mixing"). This improves the mechanical strength of the final bulk catalyst composition.

It has been found that compositing the bulk metal particles with binder material and/or incorporating binder material during the preparation of the bulk metal particles leads to bulk catalyst compositions of particularly high mechanical strength, in particular if the median particle size of the bulk metal particles is in the range of at least about 0.5 µm, more preferably at least about 1 µm, most preferably at least about 2 µm, but preferably not more than about 5000 µm, more preferably not more than about 1000 µm, even more preferably not more than about 500 µm, and most preferably not more than about 150 µm. Even more preferably, the median particle diameter lies in the range of about 1 to about 150 µm and most preferably in the range of about 2 to about 150 µm.

The compositing of the bulk metal particles with the material results in bulk metal particles embedded in this material or vice versa. Normally, the morphology of the bulk metal particles is essentially maintained in the resulting bulk catalyst composition.

As stated above, the material may be selected from the group consisting of binder materials, binder precursor materials, conventional hydroprocessing catalysts, cracking compounds, phosphorus-containing compounds, boron-containing compounds, silicon-containing compounds, fluorine-containing compounds, additional transition metals, rare earth metals or mixtures thereof, a binder material, a conventional hydroprocessing catalyst, a cracking compound, or mixtures thereof. These materials will be described in more detail below.

The binder materials to be applied may be any materials conventionally applied as binders in hydroprocessing catalysts. Examples are silica, silica-alumina, such as conventional silica-alumina, silica-coated alumina and alumina-coated silica, alumina such as (pseudo) boehmite, or gibbsite, titania, titania-coated alumina, zirconia, hydrotalcite, or mixtures thereof. Preferred binders are silica, silica-alumina, alumina, titania, titania-coated alumina, zirconia, bentonite, or mixtures thereof. These binders may be applied as such or after peptization.

It is also possible to use precursors of these binders which during the process of the invention are converted into any of the above-described binders. Suitable precursors are, e.g., alkali metal aluminates (to obtain an alumina binder), water glass (to obtain a silica binder), a mixture of alkali metal aluminates and water glass (to obtain a silica-alumina binder), aluminium chlorohydrol, aluminium sulfate, aluminium nitrate, aluminium chloride, or mixtures thereof.

If desired, the binder material may be composited with a Group VIB metal-containing compound and/or a Group VIII non-noble metal-containing compound, prior to being composited with the bulk metal particles and/or prior to being added during the preparation thereof. Compositing the binder material with any of these metal-containing compounds may be carried out by impregnation of the binder with these materials. Suitable impregnation techniques are known to the person skilled in the art. If the binder needs to be peptized, it is also possible to carry out the peptization in the presence of Group VIB and/or Group VIII non-noble metal containing compounds.

If alumina is used as binder, the surface area of the alumina generally lies in the range of about 50 to about 600 m²/g and preferably about 100 to about 450 m²/g, as measured by the B.E.T. method. The pore volume of the alumina preferably is in the range of about 0.1 to about 1.5 ml/g, as measured by nitrogen adsorption. Before the characterization of the alumina, it is thermally treated at 600° C. for 1 hour.

Generally, the binder material to be added in the process of the invention has less catalytic activity than the bulk metal particles or no catalytic activity at all. Consequently, by adding a binder material, the activity of the bulk catalyst composition may be reduced. Furthermore, the addition of binder material leads to a considerable increase in the mechanical strength of the final bulk catalyst composition. Therefore, the amount of binder material to be added in the process of the invention generally depends on the desired activity and/or desired mechanical strength of the final bulk catalyst composition. Binder amounts from 0 to about 95 wt. % of the total composition can be suitable, depending on the envisaged catalytic application. However, to take advantage of the resulting unusually high activity of the bulk metal particles of the present invention, the binder amounts to be added generally are in the range of about 1 to about 75 wt. % of the total composition, preferably about 1 to about 50 wt. %, more preferably about 1 to about 30 wt. %, even more preferably about 3 to about 20 wt. %, and most preferably about 4 to about 12 wt %.

The bulk metal particles of the present invention may also be combined with conventional hydroprocessing catalysts include known hydro-desulfurization, hydrodenitrogenation, or hydrocracking catalysts. These catalysts can be added in the used, regenerated, fresh, or sulfided state. If desired, the conventional hydroprocessing catalyst may be milled or treated in any other conventional way before being applied in the process of the invention.

The bulk metal particles of the present invention may also be combined with cracking components. A cracking compound according to the present invention is any conventional cracking compound such as cationic clays, anionic clays, crystalline cracking compounds such as zeolites, e.g. ZSM-5, (ultra-stable) zeolite Y, zeolite X, ALPOs, SAPOs, MCM-41, amorphous cracking compounds such as silica-alumina, or mixtures thereof. It will be clear that some materials may act as binder and cracking compound at the same time. For instance, silica-alumina may have a cracking and a binding function at the same time.

If desired, the cracking compound may be composited with a Group VIB metal and/or a Group VIII non-noble metal prior to being composited with the bulk metal particles. Compositing the cracking compound with any of these metals may take the form of impregnation of the cracking compound with these materials.

Generally, it depends on the envisaged catalytic application of the final bulk catalyst composition which of the above-described cracking compounds, if any, is added. A crystalline cracking compound is preferably added if the resulting composition is to be applied in hydrocracking. Other cracking compounds such as silica-alumina or cationic clays are preferably added if the final bulk catalyst composition is to be used in hydrotreating applications or mild hydrocracking. The amount of cracking material, which is added, depends on the desired activity of the final composition and the application envisaged, and thus may vary from 0 to about 90 wt. %, based on the total weight of the bulk catalyst composition.

Phosphorus-containing compounds that may be combined with the bulk metal particles include ammonium phosphate, phosphoric acid or organic phosphorus-containing compounds. Phosphorus-containing compounds can be added prior to the shaping step and/or subsequent to the shaping step. If the binder material needs to be peptized, phosphorus-containing compounds can also be used for peptization. For instance, an alumina binder can be peptized by being contacted with phosphoric acid or with a mixture of phosphoric acid and nitric acid.

Boron-containing compounds that may be combined with the bulk metal particles include boric acid or heteropoly compounds of boron with molybdenum and/or tungsten. A fluorine-containing compound that may typically be used is ammonium fluoride. Typical silicon-containing compounds are water glass, silica gel, tetraethylorthosilicate or heteropoly compounds of silicon with molybdenum and/or tungsten. Further, compounds such as fluorosilicic acid, fluoroboric acid, difluorophosphoric acid or hexafluorophosphoric acid may be applied if a combination of F with Si, B and P, respectively, is desired.

Suitable additional transition metals are, e.g., rhenium, manganese, ruthenium, rhodium, iridium, chromium, vanadium, iron, platinum, palladium, titanium, zirconium, niobium, cobalt, nickel, molybdenum, or tungsten. These metals can be added at any stage of the process of the present invention prior to the shaping step. Apart from adding these metals during the process of the invention, it is also possible to composite the final bulk catalyst composition therewith. Thus it is possible to impregnate the final bulk catalyst composition with an impregnation solution comprising any of these metals.

Process Step (ii)

The bulk metal particles optionally comprising any of the above (further) materials can be subjected to spray-drying, (flash) drying, milling, kneading, slurry-mixing, dry or wet mixing, or combinations thereof, with a combination of wet mixing and kneading or slurry mixing and spray-drying being preferred.

These techniques can be applied either before or after any of the above (further) materials are added (if at all), after solid-liquid separation, before or after a thermal treatment, and subsequent to re-wetting.

Preferably, the bulk metal particles are both composited with any of the above materials and subjected to any of the above techniques. It is believed that by applying any of the above-described techniques of spray-drying, (flash) drying, milling, kneading, slurry-mixing, dry or wet mixing, or combinations thereof; the degree of mixing between the bulk metal particles and any of the above materials is improved. This applies to cases where the material is added before as well as after the application of any of the above-described methods. However, it is generally preferred to add the material prior to step (ii). If the material is added subsequent to step (ii), the resulting composition preferably is thoroughly mixed by any conventional technique prior to any further process steps such as shaping. An advantage of spray-drying is that no waste water streams are obtained when this technique is applied.

Spray-drying typically is carried out at an outlet temperature in the range of about 100° to about 200° C. and preferably about 120° to about 180° C.

Dry mixing means mixing the bulk metal particles in the dry state with any of the above materials in the dry state. Wet mixing generally comprises mixing the wet filter cake comprising the bulk metal particles and optionally any of the above materials as powders or wet filter cake to form a homogenous paste thereof.

Process Step (iii)

If so desired, the bulk catalyst optionally comprising any of the above (further) materials may be shaped optionally after step (ii) having been applied. Shaping comprises extrusion, pelletizing, beading and/or spray-drying. It must be noted that if the bulk catalyst composition is to be applied in slurry-type reactors, fluidized beds, moving beds, or expanded beds, generally spray-drying or beading is applied. For fixed bed or ebullating bed applications, generally the bulk catalyst composition is extruded, pelletized and/or beaded. In the latter case, at any stage prior to or during the shaping step, any additives which are conventionally used to facilitate shaping can be added. These additives may comprise aluminium stearate, surfactants, graphite, starch, methyl cellulose, bentonite, polyethylene glycols, polyethylene oxides, or mixtures thereof. Further, when alumina is used as binder, it may be desirable to add acids such as nitric acid prior to the shaping step to peptize the alumina and to increase the mechanical strength of the extrudates.

If the shaping comprises extrusion, beading and/or spray-drying, it is preferred that the shaping step is carried out in the presence of a liquid, such as water. Preferably, for extrusion and/or beading, the amount of liquid in the shaping mixture, expressed as LOI, is in the range of about 20 to about 80%.

If so desired, coaxial extrusion of any of the above materials with the bulk metal particles, optionally comprising any of the above materials, may be applied. More in particular, two mixtures can be co-extruded, in which case the bulk metal particles optionally comprising any of the above materials are present in the inner extrusion medium while any of the above materials without the bulk metal particles is present in the outer extrusion medium or vice versa.

Process Step (iv)

After an optional drying step, preferably above about 100° C., the resulting shaped bulk catalyst composition may be thermally treated if desired. A thermal treatment, however, is not essential to the process of the invention. A "thermal treatment" according to the present invention refers to a treatment performed at a temperature of, e.g., from about 100° to about 600° C., preferably from about 200° to about 550° C., more preferably about 250° C. to about 450° C., for a time varying from about 0.5 to about 48 hours in an inert gas such as nitrogen, or in an oxygen-containing gas, such as air or pure oxygen. The thermal treatment can be carried out in the presence of water steam.

In all the above process steps the amount of liquid must be controlled. Where, prior to subjecting the bulk catalyst composition to spray-drying, the amount of liquid is too low, additional liquid must be added. Conversely where, prior to extrusion of the bulk catalyst composition, the amount of liquid is too high, the amount of liquid must be reduced using solid-liquid separation techniques such as filtration, decantation, or evaporation and, if necessary, the resulting material can be dried and subsequently re-wetted to a certain extent. For all the above process steps, it is within the scope of the skilled person to control the amount of liquid appropriately.

Process Step (v)

The process of the present invention may further comprise a sulfidation step. Sulfidation generally is carried out by contacting the bulk metal particles, directly after their preparation or after any one of process steps (i)-(iv), with a sulfur-containing compound such as elementary sulfur, hydrogen sulfide, dimethyl disulfide (DMDS), or organic or inorganic polysulfides. The sulfidation step can be carried out in the liquid and the gaseous phase. The sulfidation can be carried out subsequent to the preparation of the bulk catalyst composition but prior to step (i) and/or subsequent to step (i) but prior to step (ii) and/or subsequent to step (ii) but prior to step (iii) and/or subsequent to step (iii) but prior to step (iv) and/or subsequent to step (iv). It is preferred that the sulfidation is not carried out prior to any process step by which the obtained metal sulfides revert to their oxides. Such process steps are, e.g., a thermal treatment or spray-drying or any other high-temperature treatment if carried out under an oxygen-containing atmosphere. Consequently, if the bulk catalyst composition is subjected to spray-drying and/or any alternative technique or to a thermal treatment under an oxygen-containing atmosphere, the sulfidation preferably is carried out subsequent to the application of any of these methods. Of course, if these methods are applied under an inert atmosphere, sulfidation can also be carried out prior to these methods.

If the bulk catalyst composition is used in fixed bed processes, the sulfidation preferably is carried out subsequent to the shaping step and, if applied, subsequent to the last thermal treatment in an oxidizing atmosphere.

The sulfidation can generally be carried out in situ and/or ex situ. Preferably, the sulfidation is carried out ex situ, i.e. the sulfidation is carried out in a separate reactor prior to the sulfided bulk catalyst composition being loaded into the hydroprocessing unit. Furthermore, it is preferred that the bulk catalyst composition is sulfided both ex situ and in situ.

A preferred process of the present invention comprises the following successive process steps of preparing the bulk metal particles as described above, slurry mixing the obtained bulk metal particles with, e.g., a binder, spray drying the resulting composition, rewetting, kneading, extrusion, drying, calcining and sulfiding. Another preferred process embodiment comprises the following successive steps of preparing the bulk metal particles as described above, isolating the particles via filtration, wet mixing the filter cake with a material, such as a binder, kneading, extrusion, drying, calcining and sulfiding.

Bulk Catalyst Composition of the Invention

The invention further pertains to a bulk catalyst composition obtainable by the above-described process. Preferably, the invention pertains to a bulk catalyst composition obtainable by process step (A) and optionally one or more of process steps B (i)-(v) described above.

In a preferred embodiment, the invention pertains to a bulk catalyst composition obtainable by the above-described process wherein the morphology of the metal compound(s), which are at least partly in the solid state during the process is retained to some extent in the bulk catalyst composition. This retention of morphology is described in detail under the heading "Process of the present invention."

Oxidic Bulk Catalyst Composition

Furthermore, the invention pertains to a bulk catalyst composition comprising bulk metal particles which comprise at least one Group VIII non-noble metal and at least one Group VIB metal, wherein the metals are present in the bulk catalyst composition in their oxidic state, and wherein the characteristic full width at half maximum does not exceed 2.5° when the Group VIB metal is molybdenum, tungsten, a combination of molybdenum and tungsten, or a combination of molybdenum, tungsten and chromium, or does not exceed 4.0° when the Group VIB metal is a combination of molybdenum and chromium or a combination of tungsten and chromium.

As described under the heading "characterization methods", the characteristic full width at half maximum is determined on the basis of the peak located at $2\theta=53.9°$ ($\pm1.0°$) (when the Group VIB metal is molybdenum, tungsten, a combination of molybdenum and tungsten, or a combination of molybdenum, tungsten, and chromium) or at $2\theta=63.5°$ ($\pm0.6°$) (when the Group VIB metal is a combination of molybdenum and chromium, or a combination of tungsten and chromium).

Preferably, the characteristic full width at half maximum does not exceed 2.2°, more preferably 2.0°, still more preferably 1.8°, and most preferably it does not exceed 1.6° (when the Group VIB metal is molybdenum, tungsten, a combination of molybdenum and tungsten, or a combination of molybdenum, tungsten and chromium), or it does not exceed 3.5°, more preferably 3.0°, still more preferably 2.5°, and most preferably 2.0° (when the Group VIB metal is a combination of molybdenum and chromium, or a combination of tungsten and chromium).

Preferably, the X-ray diffraction pattern shows peaks at the positions $2\theta=35.9°$ ($\pm0.6°$), 38.7° ($\pm0.6°$), 40.8° ($\pm0.7°$), 53.9 ($\pm1.0°$) and 64.5 ($\pm1.2°$) when the Group VIB metals include tungsten. A typical X-ray diffraction pattern for a metal oxide catalyst of the invention comprising tungsten is shown in FIG. 1.

From the characteristic full width at half maximum of the oxidic bulk catalyst compositions of the present invention, it can be deduced that the microstructure of the catalyst of the present invention differs from that of corresponding catalysts prepared via co-precipitation as described in International Patent Application Publication No. WO 9903578 or U.S. Pat. No. 3,678,124.

The X-ray diffraction pattern of the bulk metal particles preferably does not contain any peaks characteristic of the metal compounds to be reacted. Of course, if desired, it is also possible to choose the amounts of metal compounds in such a way as to obtain bulk metal particles characterized by an X-ray diffraction pattern still comprising one or more peaks characteristic to at least one of these metal compounds. If, e.g., a high amount of the metal compound which is at least partly in the solid state during the process of the invention is added, or if this metal compound is added in the form of large crystalline particles, small amounts of this metal compound may be traced in the X-ray diffraction pattern of the resulting bulk metal particles.

The molar ratio of Group VIB to Group VIII non-noble metals generally ranges from about 10:1 to about 1:10 and preferably from about 3:1 to about 1:3. In the case of a core-shell structured particle, these ratios of course apply to the metals contained in the shell. The ratio of the different Group VIB metals to one another generally is not critical. The same holds when more than one Group VIII non-noble metal is applied. In cases where molybdenum and tungsten are present as Group VIB metals, the molybenum:tungsten ratio preferably lies in the range of about 9:1 to about 1:19, more preferably about 3:1 to about 1:9, most preferably about 3:1 to about 1:6.

The bulk metal particles may comprise only one Group VIII non-noble metal and only one Group VIB metal compound. In this embodiment, preferred bimetallic combinations comprise nickel-tungsten, cobalt-tungsten, nickel-molybdenum and cobalt-molybdenum, more preferably, nickel-tungsten.

The bulk metal particles may however equally comprise at least one Group VIII non-noble metal compound and at least two Group VIB metal compounds. Suitable Group VIB metals include chromium, molybdenum, tungsten, or mixtures thereof, with a combination of molybdenum and tungsten being most preferred. Suitable Group VIII non-noble metals include iron, cobalt, nickel, or mixtures thereof, preferably nickel and/or cobalt. Preferably, a combination of metals comprising nickel, molybdenum, and tungsten or nickel, cobalt, molybdenum, and tungsten, or cobalt, molybdenum, and tungsten is contained in the bulk metal particles of the invention.

Preferably, the oxidic bulk metal particles comprised in these bulk catalyst compositions have a B.E.T. surface area of at least about 10 m$^2$/g, more preferably of at least about 50 m$^2$/g, and most preferably of at least about 80 m$^2$/g, as measured via the B.E.T. method.

If during the preparation of the bulk metal particles none of the above (further) materials, such as a binder material, a cracking compound or a conventional hydroprocessing catalyst, have been added, the bulk catalyst particles will comprise about 85 to about 99.5 wt. % of Group VIB and Group VIII non-noble metals. If any of the above materials have been added during the preparation of the bulk metal particles, they will still preferably comprise greater than about 50 wt. %, and more preferably greater than about 70 wt. % of the Group VIB and Group VIII non-noble metals, calculated as oxides and based on the total weight of the bulk metal particles, the balance being any of the above-mentioned (further) materials. The amount of Group VIB and Group VIII non-noble metals can be determined via TEM-EDX, SEM-EDX, AAS, ICP and/or appropriate combinations of these methodologies. TEM and SEM-EDX is used to determine concentrations on nanometer or micrometer scale; AAS and ICP are bulk methods.

The median pore diameter (50% of the pore volume is below said diameter, the other 50% above it) of the oxidic bulk metal particles preferably is about 1 to about 25 nm, more preferably about 2 to about 15 nm and most preferably about 5 to about 15 nm (determined by $N_2$ adsorption).

The total pore volume of the oxidic bulk metal particles preferably is at least about 0.05 ml/g, more preferably at least about 0.1 ml/g, and most preferably greater than about 0.2 ml/g as determined by $N_2$ adsorption.

It is desired that the pore size distribution of the bulk metal particles is similar to that of conventional hydroprocessing catalysts. More particularly, the bulk metal particles preferably have a median pore diameter of about 3 to about 25 nm, as determined by nitrogen adsorption, a pore volume of about 0.05 to about 5 ml/g, more preferably of about 0.05 to about 4 ml/g, still more preferably of about 0.05 to about 3 ml/g, and most preferably of about 0.1 to about 2 ml/g, as determined by nitrogen adsorption.

Furthermore, these bulk metal particles preferably have a median particle size in the range of at least about 0.5 μm, more preferably at least about 1 μm, most preferably at least about 2 μm, but preferably not more than about 5000 μm, more preferably not more than about 1000 μm, even more preferably not more than about 500 μm, and most preferably not more than about 150 μm. Even more preferably, the median particle diameter lies in the range of about 1 to about 150 μm and most preferably in the range of about 2 to about 150 μm.

As has been mentioned above, if so desired, it is possible to prepare core-shell structured bulk metal particles using the process of the invention. In these particles, at least one of the metals is anisotropically distributed in the bulk metal particles. The concentration of a metal, the metal compound of which is at least partly in the solid state during the process of the invention, generally is higher in the inner part, i.e., the core of the final bulk metal particles, than in the outer part, i.e. the shell of the final bulk metal particles. Generally, the concentration of this metal in the shell of the final bulk metal particles is at most about 95% and in most cases at most about 90% of the concentration of this metal in the core of the final bulk metal particles. Further, it has been found that the metal of a metal compound, which is applied in the solute state during the process of the invention, is also anisotropically distributed in the final bulk metal particles. More particularly, the concentration of this metal in the core of the final bulk metal particles generally is lower than the concentration of this metal in the shell. Still more particularly, the concentration of this metal in the core of the final bulk metal particles is at most about 80% and frequently at most about 70% and often at most about 60% of the concentration of this metal in the shell. It must be noted that the above-described anisotropic metal distributions, if any, can be found in the bulk catalyst composition of the invention irrespective of whether the bulk catalyst composition has been thermally treated and/or sulfided. In the above cases, the shell generally has a thickness of about 10 to about 1,000 nm.

Though the above anisotropic metal distribution can be formed/obtained during the process of the invention, the Group VIB and Group VIII non-noble metals generally are homogeneously distributed in the bulk metal particles. This embodiment generally is preferred.

Preferably, the bulk catalyst composition additionally comprises a suitable binder material. Suitable binder materials preferably are those described above. The particles generally are embedded in the binder material, which functions as a glue to hold the particles together. Preferably, the particles are homogeneously distributed within the binder. The presence of the binder generally leads to an increased mechanical strength of the final bulk catalyst composition. Generally, the bulk catalyst composition of the invention has a mechanical strength, expressed as side crush strength, of at least about 1 lbs/mm and preferably of at least about 3 lbs/mm (measured on extrudates with a diameter of 1-2 mm).

The amount of binder depends inter alia on the desired activity of the bulk catalyst composition. Binder amounts from 0 to about 95 wt. % of the total composition can be suitable, depending on the envisaged catalytic application. However, to take advantage of the unusually high activity of the composition of the present invention, the binder amounts generally are in the range of 0 to about 75 wt. % of the total composition, preferably 0 to about 50 wt. %, more preferably 0 to about 30 wt. %.

If desired, the bulk catalyst composition may comprise a suitable cracking compound. Suitable cracking compounds preferably are those described above. The amount of cracking compound preferably is in the range of 0 to about 90 wt. %, based on the total weight of the bulk catalyst composition.

Moreover, the bulk catalyst composition may comprise conventional hydroprocessing catalysts. The conventional hydroprocessing catalyst generally comprises any of the above-described binder materials and cracking compounds. The hydrogenation metals of the conventional hydroprocessing catalyst generally comprise Group VIB and Group VIII non-noble metals such as combinations of nickel or cobalt with molybdenum or tungsten. Suitable conventional hydroprocessing catalysts include hydrotreating or hydrocracking catalysts. These catalysts can be in the used, regenerated, fresh, or sulfided state.

Furthermore, the bulk catalyst composition may comprise any further material, which is conventionally present in hydroprocessing catalysts such as phosphorus-containing compounds, boron-containing compounds, silicon-containing compounds, fluorine-containing compounds, additional transition metals, rare earth metals, or mixtures thereof. Details in respect of these further materials are given above. The transition or rare earth metals generally are present in the oxidic form when the bulk catalyst composition has been thermally treated in an oxidizing atmosphere and/or in the sulfided form when the bulk catalyst composition has been sulfided.

To obtain bulk catalyst compositions with high mechanical strength, it may be desirable for the bulk catalyst composition of the invention to have a low microporosity. Preferably, less than about 30% of the pore volume of the bulk catalyst composition is in pores with a diameter higher than about 100 nm (determined by mercury intrusion, contact angle: 130°), more preferably less than about 20%.

The oxidic bulk catalyst composition of the present invention generally comprises about 10 to about 100 wt. %, preferably about 25 to about 100 wt. %, more preferably about 45 to about 100 wt. % and most preferably about 65 to about 100 wt. % of Group VIB and Group VIII non-noble metals, based on the total weight of the bulk catalyst composition, calculated as metal oxides.

It is noted that a catalyst prepared via stepwise impregnation with Group VIB and Group VIII non-noble metal solutions on an alumina carrier as described in JP 09000929 does not comprise any bulk metal particles and thus has a morphology which is completely different from that of the present invention.

Sulfided Bulk Catalyst Composition

If so desired, the bulk catalyst composition of the present invention can be sulfided. Consequently, the present invention further pertains to a bulk catalyst composition comprising sulfidic bulk metal particles, which comprise at least one Group VIII non-noble metal and at least one Group VIB metal, and wherein the degree of sulfidation under conditions of use does not exceed about 90%.

It will be clear that the above sulfided bulk catalyst composition may comprise any of the above-described (further) materials.

The present invention further pertains to a shaped and sulfided bulk catalyst composition comprising i) sulfidic bulk metal particles comprising nanoparticles, at least one Group VIII non-noble metal and at least two Group VIB metals, wherein the degree of sulfidation under conditions of use does not exceed about 90%, and ii) a material selected from the group of binder materials, conventional hydroprocessing catalysts, cracking compounds, or mixtures thereof.

It is essential that the degree of sulfidation of the sulfidic bulk metal particles under conditions of use does not exceed about 90%. Preferably, the degree of sulfidation under conditions of use is in the range of about 10 to about 90%, more preferably of about 20 to about 90%, and most preferably of about 40 to about 90%. The degree of sulfidation is determined as described under the heading "characterization methods."

If conventional sulfidation techniques are applied in the process of the present invention, the degree of sulfidation of the sulfidic bulk metal particles prior to use is essentially identical to the degree of sulfidation under conditions of use. However, if very specific sulfidation techniques are applied, it might be that the degree of sulfidation prior to the use of the catalyst is higher than during the use thereof, as during use part of the sulfides or elemental sulfur is removed from the catalyst. In this case the degree of sulfidation is the one that results during use of the catalyst and not prior thereto. The conditions of use are those described below in the chapter "use according to the invention." That the catalyst is "under conditions of use" means that it is subjected to these conditions for a time period long enough for the catalyst to reach equilibrium with its reaction environment.

It is further preferred that the bulk catalyst composition of the present invention is essentially free of Group VIII non-noble metal disulfides. More in particular, the Group VIII non-noble metals are preferably present as (Group VIII non-noble metal)$_y$S$_x$, with x/y being in the range of about 0.5 to about 1.5

The shaped and sulfided catalyst particles may have many different shapes. Suitable shapes include spheres, cylinders, rings, and symmetric or asymmetric polylobes, for instance tri- and quadrulobes. Particles resulting from extrusion, beading or pilling usually have a diameter in the range of about 0.2 to about 10 mm, and their length likewise is in the range of about 0.5 to about 20 mm. Particles resulting from spray-drying generally have a median particle diameter in the range of about 1 µm to about 100 µm.

Details about the binder materials, cracking compounds, conventional hydroprocessing catalysts, and any further materials as well as the amounts thereof are given above. Further, details in respect of the Group VIII non-noble metals and the Group VIB metals contained in the sulfided bulk catalyst compositions and the amounts thereof are given above.

It is noted that the core-shell structure described above for the oxidic bulk catalyst composition is not destroyed by sulfidation, i.e., the sulfided bulk catalyst compositions may also comprise this core-shell structure.

It is further noted that the sulfided catalysts are at least partly crystalline materials, i.e., the X-ray diffraction pattern of the sulfided bulk metal particles generally comprises several crystalline peaks characteristic to the Group VIII non-noble metal and Group VIB metal sulfides.

As for the oxidic bulk catalyst composition, preferably, less than about 30% of the pore volume of the sulfidic bulk catalyst composition is in pores with a diameter higher than about 100 nm (determined by mercury intrusion, contact angle: 130°), more preferably less than about 20%.

Generally, the median particle diameters of the sulfidic bulk metal particles are identical to those given above for the oxidic bulk metal particles.

Use According to the Invention

The bulk catalyst composition according to the invention is particularly useful for hydroprocessing hydrocarbon feedstocks. Accordingly, the invention relates to a process for hydroprocessing a hydrocarbon feedstock, said process comprising contacting a hydrocarbon feedstock under hydroprocessing conditions with a catalyst composition comprising bulk metal particles that comprise at least one Group VIII non-noble metal, at least one Group VIB metal and nanoparticles.

The catalyst composition according to the invention can be used in virtually all hydroprocessing processes to treat a plurality of feeds under wide-ranging reaction conditions such as temperatures of from 100 to 450° C., hydrogen pressures of from 5 to 1200 bar, preferably below 300 bars, liquid hourly space velocities of from 0.05 to 10 h$^{-1}$ and hydrogen treat gas rates of from about 18 to about 1800 m$^3$/m$^3$ (100 to 10,000 SCF/B). The term hydroprocessing used in the context of this invention encompasses all processes in which a hydrocarbon feedstock is reacted with hydrogen at the temperatures and pressures noted above, and including hydrogenation, hydrodesulfurization, hydrodenitrogenation, hydrodemetallization, hydrodearomatization, hydroisomerization, hydrodewaxing, hydrotreating, hydrofinishing and hydrocracking.

The catalyst composition of the invention is particularly effective for the removal of nitrogen and sulfur from a hydrocarbon feed. Accordingly, in a preferred embodiment, the catalyst of the invention is used to remove sulfur, nitrogen, or a combination of sulfur and nitrogen, from hydrocarbon feedstocks. The contacting of the hydrocarbon feedstock with the catalyst composition occurs in the presence of a hydrogen-containing treat gas, and the reaction is operated under effective hydroprocessing conditions. The contacting of the hydrocarbon feedstock with the catalyst composition produces a hydrocarbon product, liquid under atmospheric conditions, that has less nitrogen, sulfur, or both, compared to the feedstock.

The hydrocarbon feedstock is a material comprising hydrogen and carbon. A wide range of petroleum and chemical hydrocarbon feedstocks can be hydroprocessed in accordance with the present invention. Hydrocarbon feedstocks include those obtained or derived from crude petroleum oil, from tar sands, from coal liquefaction, from shale oil and from hydrocarbon synthesis, such as reduced crudes, hydrocrackates, raffinates, hydrotreated oils, atmospheric and vacuum gas oils, coker gas oils, atmospheric and vacuum resids, deasphalted oils, dewaxed oils, slack waxes, Fischer-Tropsch waxes and mixtures thereof. Suitable feedstocks range from relatively light distillate fractions up to heavy feedstocks, such as gas oils, lube oils and resids. Non-limiting examples of light distillate feedstocks include naphtha (typical boiling range of from about 25° C. to about 210° C.), diesel (typical boiling range of from about 150° C. to about 400° C.), kerosene or jet fuel (typical boiling range of from about 150° C. to about 250° C.) and the like. Non-limiting examples of heavy feedstocks include vacuum (or heavy) gas oils (typical boiling range of from about 315° C. to about 610° C.), raffinates, lube oils, cycle oils, waxy oils and the like. Preferred hydrocarbon feedstocks have a boiling range of from about 150° C. to about 650° C., conveniently from about 150° C. to about 450° C.

The catalyst composition of the present invention is particularly effective for removing sulfur, nitrogen or a combination of sulfur and nitrogen from hydrocarbon feedstocks. Hydrocarbon feedstocks indeed often contain nitrogen and sulfur contaminants, often in the form of sulfur and/or nitrogen-containing organic compounds. The nitrogen content of the feedstock can be up to about 5000 wppm nitrogen, preferably up to about 2000 wppm nitrogen, more preferably up to 1000 wppm nitrogen and most preferably up to 500 wppm nitrogen. Nitrogen contaminants may be basic or non-basic. Examples of basic nitrogen contaminants include quinolines and substituted quinolines, and examples of non-basic nitrogen species include carbazoles and substituted carbazoles. The sulfur content of the feedstock may be from 0.05 wt % to 3 wt %, and is typically less than 2 wt %.

In a preferred embodiment, effective hydroprocessing conditions are effective hydrotreating conditions, that is, conditions effective for at least one of (i) hydrogenation or (ii) hydrogenolysis. Generally, hydrotreating conditions will result in removing at least a portion of the heteroatoms in the feed and in hydrogenating at least a portion of the aromatics in the feed. Hydrotreating conditions typically include temperatures ranging from about 100° C. to about 450° C., preferably from about 200° C. to about 370° C., more preferably from about 230° C. to about 350° C. Typical liquid hourly space velocities ("LHSV") range from about 0.05 to about 20 $h^{-1}$, preferably from about 0.5 to about 5 $h^{-1}$. Any effective pressure can be utilized, and pressures typically range from about 5 to about 250 bar. Hydrogen ($H_2$) to oil ratio generally ranges from about 18 to about 1800 $m^3/m^3$ (100 to 10000 SCF/B). Process conditions may vary, as is known to those skilled in the art, depending on the feed boiling range and speciation. Generally, as the boiling point of the feed increases, the severity of the conditions will also increase. The following table serves to illustrate typical conditions for a range of feeds.

preferred. Such other types of catalyst beds include fluidized beds, ebullating beds, slurry beds, and moving beds. Interstage cooling or heating between reactors, reaction zones, or between catalyst beds in the same reactor, can be employed. A portion of the heat generated during hydroprocessing can be recovered. Where this heat recovery option is not available, conventional cooling may be performed through cooling utilities such as cooling water or air, or through use of a hydrogen quench stream. In this manner, optimum reaction temperatures can be more easily maintained.

Characterization Methods

The methods described below represent those characterization methods deemed most appropriate for this invention. However, the skilled person would be aware of other techniques, such as Raman or Infrared spectroscopy that could equally be employed in characterization of products.

1. Side Crush Strength Determination

First, the length of, e.g., an extrudate particle was measured, and then the extrudate particle was subjected to compressive loading (25 lbs in 8.6 sec.) by a movable piston. The force required to crush the particle was measured. The procedure was repeated with at least 40 extrudate particles and the average was calculated as force (lbs) per unit length (mm). The method preferably was applied to shaped particles with a length not exceeding 7 mm.

2. Pore Volume Via $N_2$ Adsorption

The $N_2$ adsorption measurement was carried out as described in the Ph.D. dissertation of J. C. P. Broekhoff (Delft University of Technology 1969), the disclosure of which is hereby incorporated by reference.

3. Amount of Added Solid Metal Compounds

Qualitative determination: The presence of solid metal compounds during the process of the invention can easily be detected by visual inspection at least if the metal compounds are present in the form of particles with a diameter larger than the wavelength of visible light. Of course, methods such as quasi-elastic light scattering (QELS) or near-forward

| FEED | TYPICAL BOILING RANGE ° C. | TEMP. ° C. | PRESS, BAR | SPACE VELOCITY V/V/HR | $H_2$ GAS RATE SCF/B |
|---|---|---|---|---|---|
| Naphtha | 25-210 | 100-370 | 10-60 | 0.5-10 | 100-2,000 |
| Diesel | 150-400 | 200-400 | 15-110 | 0.5-4 | 500-6,000 |
| Heavy Gas Oil | 315-610 | 260-430 | 15-170 | 0.3-2 | 1000-6,000 |
| Lube Oil | 290-550 | 200-450 | 6-210 | 0.2-5 | 100-10,000 |
| Resid | 10-50% > 575 | 340-450 | 65-1100 | 0.1-1 | 2,000-10,000 |

The process uses hydrogen or a hydrogen-containing treat gas. Treat gas can comprise substantially pure hydrogen or can be mixtures of other components typically found in refinery hydrogen streams. It is preferred that the treat gas contain little, more preferably no, hydrogen sulfide. The treat gas purity should be at least about 50% by volume hydrogen, preferably at least about 75% by volume hydrogen, and more preferably at least about 90% by volume hydrogen. The treat gas can be pure or substantially pure hydrogen.

The hydroprocessing occurs in a reaction stage. The reaction stage can comprise one or more reactors or reaction zones each of which comprises one or more catalyst beds of the same or different catalyst. At least one bed will contain the catalyst composition of the invention. Although other types of catalyst beds/reactors can be used, fixed beds are scattering, which are known to the skilled person, can also be used to verify that at no point in time during the process of the invention all metals will be in the solute state.

Quantitative determination: if the metal compounds which are added at least partly in the solid state are added as suspension(s), the amount of solid metal compounds added during the process of the invention can be determined by filtration of the suspension(s) to be added under the conditions which are applied during the addition (temperature, pH, pressure, amount of liquid), in such a way that all solid material contained in the suspension(s) is collected as solid filter cake. From the weight of the solid and dried filter cake, the weight of the solid metal compounds can be determined by standard techniques. Of course, if apart from solid metal compounds further solid compounds, such as a solid binder, are present in the filter cake, the weight of this solid and dried binder must be subtracted from the weight of the solid and dried filter cake.

The amount of solid metal compounds in the filter cake can also be determined by standard techniques such as atomic absorption spectroscopy (AAS), XRF, wet chemical analysis, or ICP.

If the metal compounds, which are added at least partly in the solid state, are added in the wetted or dry state, a filtration generally is not possible. In this case, the weight of the solid metal compounds is considered equal to the weight of the corresponding initially employed metal compounds, on a dry basis. The total weight of all metal compounds is the amount of all metal compounds initially employed, on a dry basis, calculated as metal oxides.

4. Characteristic Full Width at Half Maxim

The characteristic full width at half maximum of the oxidic catalysts was determined on the basis of the X-ray diffraction pattern of the catalysts using a linear background:

a) if the Group VIB metals are molybdenum and tungsten: the characteristic full width at half maximum is the full width at half maximum (in terms of $2\theta$) of the peak at) $2\theta=53.6°$ ($\pm 0.7°$), b) if the Group VIB metals are molybdenum and chromium: the characteristic full width at half maximum is the full width at half maximum (in terms of $2\theta$) of the peak at) $2\theta=63.5°$ ($\pm 0.6°$), c) if the Group VIB metals are tungsten and chromium: the characteristic full width at half maximum is the full width at half maximum (in terms of $2\theta$) of the peak at) $2\theta=53.6°$ ($\pm 0.7°$), d) if the Group VIB metals are molybdenum, tungsten, and chromium: the characteristic full width at half maximum is the full width at half maximum (in terms of $2\theta$) of the peak at $2\theta=53.6°$ ($\pm 0.7°$).

For the determination of the X-ray diffraction pattern, a standard powder diffractometer (e.g., Philips PW1050) equipped with a graphite monochromator can be used. The measurement conditions can be chosen as follows:

X-ray generator settings: 40 kV and 40 mA
wavelength: 1.5418 angstroms
divergence and anti-scatter slits: 1°
detector slit: 0.2 mm,
step size: 0.04 (°$2\theta$)
time/step: 20 seconds 5. Degree of Sulfidation Any sulfur contained in the sulfidic bulk catalyst composition was oxidized in an oxygen flow by heating in an induction oven. The resulting sulfur dioxide was analyzed using an infrared cell with a detection system based on the IR characteristics of the sulfur dioxide. To obtain the amount of sulfur the signals relating to sulfur dioxide are compared to those obtained on calibration with well-known standards. The degree of sulfidation is then calculated as the ratio between the amount of sulfur contained in the sulfidic bulk metal particles and the amount of sulfur that would be present in the bulk metal particles if all Group VIB and Group VIII non-noble metals were present in the form of their disulfides.

It will be clear to the skilled person that the catalyst, the degree of sulfidation of which is to be measured, is to be handled under an inert atmosphere prior to the determination of the degree of sulfidation.

6. Dimension of the Nanoparticles

The dimension of the dispersed nanoparticles can be determined by transmission electron microscopy (TEM) (for example, after careful evaporation of a suspension of dispersed particles, or, as the clay nanoparticles have different morphology than the bulk catalyst, by TEM analysis of bulk catalyst particles), or by light scattering methods (f. ex. in the slurry). Although an accurate and absolute value for the dimension is difficult to establish, it is for the purposes of the invention sufficient to determine that a sufficiently large part, preferably at least about 50%, has a size below one micrometer. This assessment can be done by taking a TEM picture as is known by the person skilled in the art and assessing on a representative picture, preferably covering an area of at least about 500 by about 500 nanometer, whether there are a substantial number of particles having a size less than about 500 nanometer.

The invention will be further illustrated by the following Examples.

Example E1 (Ni1Mo0.5W0.5+3 w % Laponite)

20.3 g of laponite (LOI=11.2%, Laponite RD available from Rockwood Additives Limited) was suspended in water in a separate stirred vessel for approximately one hour. According to the supplier specification, disc-like platelets of about 0.92 nm thickness and having a lateral dimension of about 25 nm and a surface area of over 900 m$^2$·g$^{-1}$ should be obtained after complete delamination. The particle length and stacking was verified using TEM. Most of the clay particles indeed consisted of a single layer about 25 nm long. However, a small portion of the clay particles was not fully delaminated, i.e. the particles were longer (up to 60 nm) and consisted of multiple layers (up to 5 layers.)

Separately, 1211 g of nickel hydroxy carbonate paste (10.7 wt. % Ni: 2.21 mol Ni) was suspended in water and the mixture was stirred until the slurry became homogeneous. Then 161 g of MoO$_3$ (99.1% MoO$_3$, 1.1 mol Mo) and 277 g H$_2$WO$_4$ (92.7 wt % WO$_3$, 1.03 mol W) were added to the nickel slurry and the mixture was stirred until the slurry became homogeneous. Then the laponite suspension was added and the mixture was stirred until the slurry became homogeneous. The reaction was carried out in an open vessel. The reaction mixture was stirred during the entire process, i.e. when combining the raw materials and when reacting them. The reaction was carried out by increasing the temperature to 95° C. and maintaining the mixture at that temperature for 24 hours. The pH of the reaction mixture was 5.2 at the start of the reaction time and 5.0 at the end of the reaction time.

The slurry was then allowed to cool down and was then filtered. The resulting filter cake was combined with surfactant and 15.3 gr of attapulgite (LOI=20.5%), a needle-like clay mineral composed of magnesium-aluminum silicate having a lateral dimension above 1 micrometer in a kneader. Furthermore, 27.6 g of microgranular SiO$_2$ (LOI=11.8 wt. %, surface area of about 190 m$^2$/g, median particle diameter of 22 micrometer) was added to the cake. Depending on the water content of the filter cake, the water content of the extrusion mix was adjusted (by adding water or by evaporating water) to obtain an extrudable mix. The mix was then extruded, dried in air at 120° C. overnight and calcined at 340° C. for ½ hour. The amount of laponite (relative to the total amount of metal oxides+laponite) was 3.0 wt %. The amount of laponite in the end product (=final calcined catalyst including also ca. 1.9 wt. % attapulgite and ca. 3.8 wt. % silica) was 2.8 wt. %. This catalyst was then sulfided and tested as described below in Test Procedures 1 and 2.

Comparative Experiment C1 (Ni1Mo0.5W0.5)

In this experiment, Example E1 was repeated without the addition of the laponite suspension. This catalyst was then sulfided and tested as described below in Test Procedures 1 and 2.

Testing E1 and C1 by Test Procedures 1 and 2

The catalysts prepared in examples E1 and C1 were tested in Test Procedure 1 described below in the hydrotreatment of a Vacuum Gas Oil (VGO) feedstock using 4 different test conditions (TC1.1 to TC1.4, respectively) and in Test Procedure 2 in the hydrotreatement of Ultra Low Sulfur Diesel (ULSD) feedstock using in 2 different test conditions (TC2.1 and TC2.2, respectively). The test conditions and the test results are given in Table 3. For each test procedure the residual sulfur level (S in ppm) and nitrogen (N in ppm) is given with the activity (relative volume activity RVA) for sulfur removal (HDS) and nitrogen removal (HDN). For each test condition, the activity of the catalyst of the comparative experiment was set at 100% and the activity of the catalysts according to the invention was expressed in percentage relative to the comparative catalyst. CBD is the compacted bulk density of the catalyst. Details of the test procedure are described in more detail below.

Test Procedure 1: VGO Testing

The catalysts were tested in an upflow tubular reactor. Each reactor tube contained 50 ml of catalyst mixed with an equal amount of SiC particles and sandwiched between layers of SiC particles. Before testing the catalysts were presulfided via liquid phase presulfiding, using the feed described below in Table 1 which had been spiked with dimethyl disulfide to a total sulfur content of 3.7 wt. % at temperature of 320° C., a pressure of 40 bar, a hydrogen to oil ratio (Nl/l) of 300 and at a liquid hourly space volume (LHSV) (1/h) of 1.76. The presulfided catalysts were then tested in the hydrotreating of a VGO feedstock having the properties shown in Table 1.

TABLE 1

| VGO FEED | |
|---|---|
| Feed | |
| Density at 15° C. (g/ml) | 0.9207 |
| Density at 50° C. (g/ml) | 0.8964 |
| Hydrogen Content (% wt.) | 12.2 |
| Sulfur Content (% wt.) | 1.6297 |
| Nitrogen Content (ppmwt.) | 1714 |
| Pour Point (° C.) | 46 |
| Viscosity at 50° C. (mm$^2$/s) | 25.91 |
| Total Aromatics | 46.1 |
| ASTM Distillation | |
| IBP (° C.) | 268.2 |
| V05 (° C.) | 340.4 |
| V10 (° C.) | 370.0 |
| V20 (° C.) | 407.6 |
| V30 (° C.) | 433.6 |
| V40 (° C.) | 455.7 |
| V50 (° C.) | 475.9 |
| V60 (° C.) | 495.0 |
| V70 (° C.) | 514.4 |
| V80 (° C.) | 536.7 |
| V90 (° C.) | 563.6 |
| V95 (° C.) | 578.7 |
| FBP (° C.) | 611.4 |

The results of the VGO test for the catalysts of examples E1 and C1 are shown in Table 3.

Test Procedure 2: ULSD Testing

The catalysts were tested in the same way as in Test Procedure 1, except the amount of catalyst was 10 ml instead of 50 ml, the liquid hourly space volume (LHSV) (1/h) was 3.00 instead of 1.76 and the feedstock spiked with dimethyl disulfide was the ultra low sulfur feed of Table 2. The presulfided catalysts were then tested in the hydrotreating of a diesel feedstock having the properties shown in Table 2:

TABLE 2

| ULTRA LOW SULFUR DIESEL FEED | |
|---|---|
| S (wt. %) | 1.2 |
| N (ppmwt) | 102 |
| Total aromatics (wt. %) | 28.3 |
| Polynuclear aromatic (PNA) (wt. %) | 11.8 |
| Mono-aromatics (wt. %) | 16.5 |
| Di-aromatics (wt. %) | 11.0 |
| Di+-aromatics (wt. %) | 0.8 |
| Simulated distillation ASTM-D 86 | |
| Initial boiling point | 178.4° C. |
| 5 vol. % | 211.1° C. |
| 10 vol. % | 224.0° C. |
| 30 vol. % | 261.4° C. |
| 50 vol. % | 283.8° C. |
| 70 vol. % | 309.3° C. |
| 90 vol. % | 347.8° C. |
| Final boiling point | 372.0° C. |

The results of the VGO test for the catalysts of examples E1 and C1 are shown in Table 3.

TABLE 3

| SAMPLE | COMPOSITION | TEST | T (° C.) | P (bar) | H$_2$/OIL (Nl/l) | LHSV (1/h) | CBD loaded | S ppm | N ppm | RVA HDS | RVA HDN |
|---|---|---|---|---|---|---|---|---|---|---|---|
| VGO | | | | | | | | | | | |
| E1.1 | Ni1Mo0.5W0.5, 3 wt % Lap | TC1.1 | 360 | 120 | 1000 | 1.25 | 1.22 | 44.6 | 155 | 116 | 121 |
| C1.1 | Ni1Mo0.5W0.5 | TC1.1 | 360 | 120 | 1000 | 1.25 | 1.12 | 53.7 | 232 | 100 | 100 |
| E1.2 | Ni1Mo0.5W0.5, 3 wt % Lap | TC1.2 | 370 | 120 | 1000 | 1.25 | 1.22 | 9.1 | 35 | 130 | 115 |

TABLE 3-continued

| SAMPLE | COMPOSITION | TEST | T (° C.) | P (bar) | $H_2$/OIL (Nl/l) | LHSV (1/h) | CBD loaded | S ppm | N ppm | RVA HDS | RVA HDN |
|---|---|---|---|---|---|---|---|---|---|---|---|
| C1.2 | Ni1Mo0.5W0.5 | TC1.2 | 370 | 120 | 1000 | 1.25 | 1.12 | 12.9 | 57 | 100 | 100 |
| E1.3 | Ni1Mo0.5W0.5, 3 wt % Lap | TC1.3 | 370 | 120 | 1000 | 0.9 | 1.22 | 1.9 | cnbd | 115 | cnbd |
| C1.3 | Ni1Mo0.5W0.5 | TC1.3 | 370 | 120 | 1000 | 0.9 | 1.12 | 2.3 | cnbd | 100 | cnbd |
| E1.4 | Ni1Mo0.5W0.5, 3 wt % Lap | TC1.4 | 370 | 120 | 1000 | 1 | 1.22 | 2.7 | 6 | 128 | 110 |
| C1.4 ULSD | Ni1Mo0.5W0.5 | TC1.4 | 370 | 120 | 1000 | 1 | 1.12 | 3.9 | 11 | 100 | 100 |
| E1.5 | Ni1Mo0.5W0.5, 3 wt % Lap | TC2.1 | 320 | 45 | 300 | 2 | 1.27 | 0.7 | 0.3 | 167 | 103 |
| C1.5 | Ni1Mo0.5W0.5 | TC2.1 | 320 | 45 | 300 | 2 | 1.20 | 2.2 | 0.4 | 100 | 100 |
| E1.6 | Ni1Mo0.5W0.5, 3 wt % Lap | TC2.2 | 320 | 45 | 300 | 2.25 | 1.27 | 3.2 | 0.4 | 156 | 104 |
| C1.6 | Ni1Mo0.5W0.5 | TC2.2 | 320 | 45 | 300 | 2.25 | 1.20 | 8.6 | 0.5 | 100 | 100 | cnbd = Could not be determined.

Example E2 (Ni1W1+3 w % Laponite)

1.8 g laponite (LOI=11.2%, Laponite RD available from Rockwool Additives Limited) was suspended in water in a separate stirred vessel for approximately one hour. 50.0 g of tungstic acid $H_2WO_4$ (0.2 mole W) was slurried in one liter of water together with 23.5 g of nickel hydroxycarbonate $2NiCO_3*3Ni(OH)_2*4H_2O$ (0.2 mole of Ni). Then the laponite suspension was added and the mixture was stirred until the slurry became homogeneous. The suspension was heated to 95° C. and held at that temperature for a period of 24 hours (overnight) with continuous stirring. At the end of this time, the suspension was filtered. The resulting solid was dried at 120° C. for 16 hours (overnight). The resulting solid was pelleted, the pellets were crushed and 40-60 mesh fraction was isolated by sieving. The material was then calcined at 300° C. for 1 hour. The material was then sulfided and tested as described below in Test Procedure 3.

Example E3 (Ni1Mo0.5W0.5+3 w % Laponite)

The same catalyst as Example 1 was sulfided and tested as described below in Test Procedure 3.

Comparative Experiment C2 (Ni1Mo0.5W0.5 No Laponite)

The same catalyst as Comparative 1 was sulfided and tested as described below in Test Procedure 3.

Comparative Experiment C3 (Ni1W1 No Laponite)

A catalyst was prepared as described in Example E2, however without the addition of laponite suspension. The catalyst was sulfided and tested as described below in Test Procedure 3.

Comparative Experiment C4 (Ni1W1 No Laponite—150° C.)

A catalyst was prepared in a procedure similar to that of Comparative example C3, except the reaction was carried out at 150° C. in an autoclave heated with microwave radiation, under autogenic pressure for about 6 hours, instead of 95° C. under atmospheric pressure in an open vessel for 24 hours. 2.35 g of Ni carbonate (0.02 moles Ni) was added to 100 cc of water along with 4.99 grams of tungstic acid (0.02 mole W). The suspension was put into a sealed Weflon™ vessel of 275 cc total volume and heated with microwave radiation at 10° C./min to 150° C. and held under autogenic pressure at that temperature for 6 hours with continuous stirring. The sample was cooled to room temperature and the solid filtered and dried overnight at 120° C. The obtained material was pelleted, the pellets were crushed and a 40-60 mesh fraction was isolated by sieving. The material was then calcined at 300° C. for 1 hour. The material was then sulfided and tested using Test Procedure 3.

Comparative Experiment C5 (Ni1W1 No Laponite—90° C., 7 Days)

A catalyst was prepared in a procedure similar to that of Comparative example C3, except the reaction was carried out at 90° C. in an open vessel for 7 days.

50.0 g of tungstic acid $H_2WO_4$ (0.2 mole W) was slurried in one liter of water together with 23.5 g of nickel hydroxycarbonate $2NiCO_3*3Ni(OH)_2*4H_2O$ (0.2 mole of Ni). The suspension of the 2 solids was heated to 90° C. and held at that temperature for a period of 7 days with continuous stirring. At the end of this time, the suspension was filtered. The resulting solid was dried at 120° C. for 16 hours (overnight). The resulting solid was pelleted, the pellets were crushed and a 40-60 mesh fraction was isolated by sieving. The material was then calcined at 300° C. for 1 hour. The material was then sulfided and tested using Test Procedure.

Test Procedure 3: Diesel

The catalysts E2, E3 and C2 to C5 were tested in a diesel hydrotreatment process in a down-flow tubular reactor. Each reactor tube contained 10 ml of catalyst mixed with an equal amount of SiC particles and sandwiched between layers of SiC particles. Before being tested the catalysts were presulfided via liquid phase presulfiding using the feed described in Table 4, which had been spiked with dimethyl disulfide to a total sulfur content of 3.7 wt. %. The presulfided catalysts were then tested in the hydrotreatment of a diesel feedstock having the properties shown in Table 4.

TABLE 4

| GAS OIL FEEDSTOCK | |
|---|---|
| S (wt. %) | 1.1969 |
| N (ppm wt) | 102 |
| total aromatics (wt. %) | 28.3 |
| mono-aromatics (wt. %) | 16.5 |
| di-aromatics (wt. %) | 11.0 |
| tri+-aromatics (wt. %) | 0.8 |
| SIMULATED DISTILLATION ASTM-D 86 | |
| Initial boiling point | 178.4° C. |
| 5 vol. % | 211° C. |

TABLE 4-continued

| | |
|---|---|
| 10 vol. % | 224° C. |
| 30 vol. % | 261° C. |
| 50 vol. % | 283° C. |
| 70 vol. % | 309° C. |
| 90 vol. % | 348° C. |
| Final boiling point | 372° C. |

The catalysts were tested under the two conditions shown in Table 5. The test results are given in Table 6, wherein suffix 1 and 2 after HDS, HDN, N and S refer to Conditions 1 and 2 given in Table 5.

TABLE 5

| | Presulfiding | Condition 1 | Condition 2 |
|---|---|---|---|
| Temperature (° C.) | 320 | 320 | 340 |
| Pressure (bar) | 45 | 45 | 20 |
| $H_2$ to oil ratio (Nl/l) | 200 | 300 | 300 |
| LHSV (l/h) | 3.00 | 3.00 | 1.50 |

The results presented in Table 6 show that nanosized clays allows the preparation of catalysts with superior hydrotreating performances relative to catalysts prepared without nanosized clays, even when long reaction times or hydrothermal conditions are used in the absence of nanosized clays.

TABLE 6

| SAMPLE | COMPOSITION | TEST | CBD loaded | S1 ppm | S2 ppm | N1 ppm | N2 ppm | RVA HDS1 | RVA HDS2 | RVA HDN1 | RVA HDN2 |
|---|---|---|---|---|---|---|---|---|---|---|---|
| E2 | Ni1W1 + 3 w % laponite | TC3 | 1.53 | 0.7 | 0.8 | 0.3 | 1.3 | 403 | 155 | 110 | 139 |
| E3 | Ni1Mo0.5W0.5 + 3 w % laponite | TC3 | 1.27 | 7.7 | 2 | 0.4 | 3.8 | 140 | 104 | 106 | 105 |
| C2 | Ni1.5Mo0.5W0.5 | TC3 | 1.25 | 15.7 | 2.2 | 0.5 | 4.4 | 100 | 100 | 100 | 100 |
| C3 | Ni1W1-95° C./1 day | TC3 | 1.12 | 159 | 20.6 | 27 | 29 | 26 | 36 | 25 | 38 |
| C4 | Ni1W1-150° C. | TC3 | 1.72 | 0.9 | 0.9 | 0.3 | 1.4 | 347 | 151 | 110 | 130 |
| C5 | Ni1W1-90° C./7 days | TC3 | 1.51 | 6.7 | 1.7 | 0.3 | 2.9 | 148 | 112 | 105 | 102 |

Example E4 (Ni1W1+10 wt. % Laponite)

Figure 2:
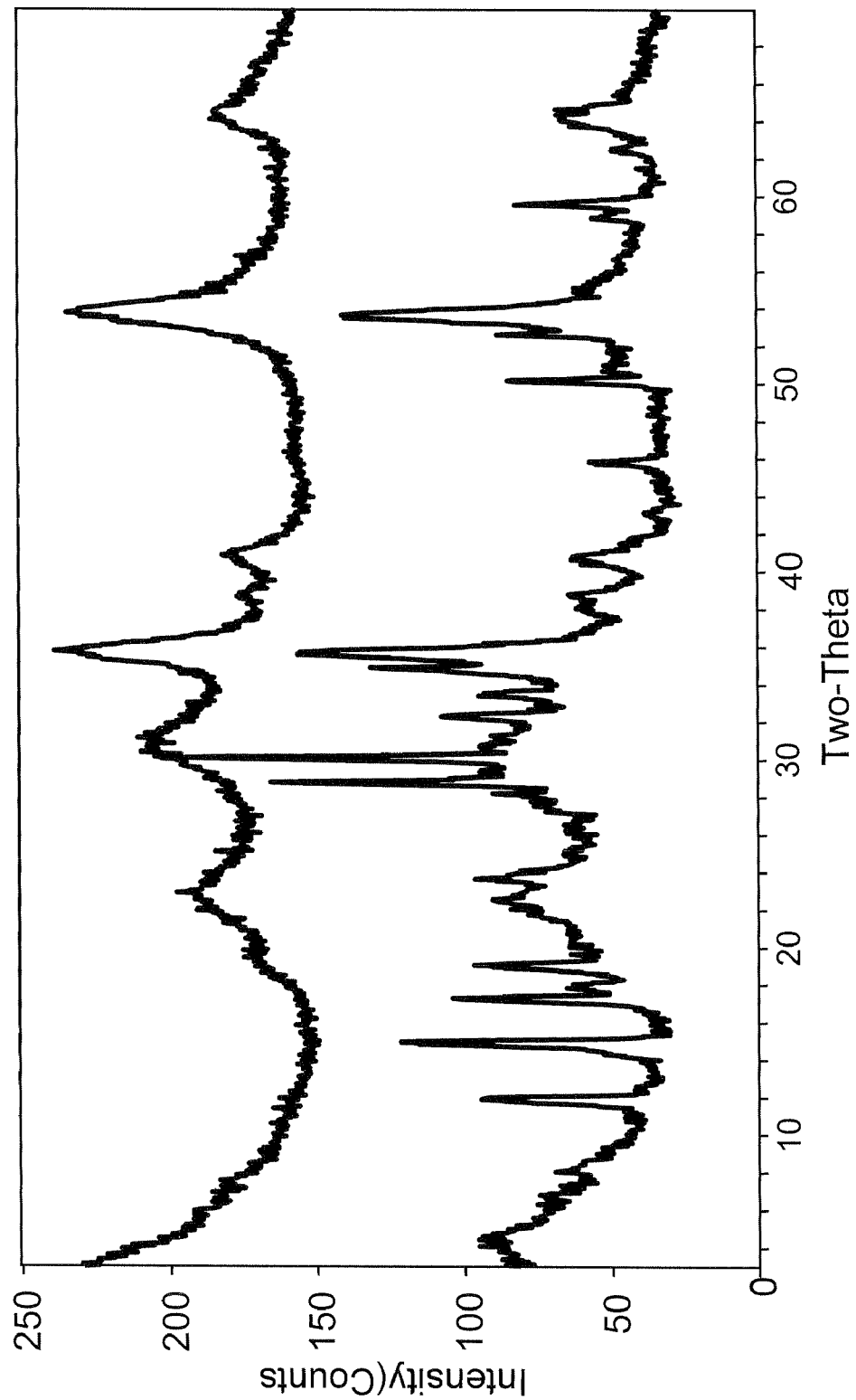
FIG. 2 shows a comparison between the X-ray diffraction pattern of a bulk catalyst composition according to the present invention and a comparative composition.

7.3 g laponite (LOI=11.2%, Laponite RD available from Rockwool Additives Limited) was suspended in one liter of water in an open stirred vessel for approximately one hour. As mentioned in Example E1, the laponite used in this example is formed of primary particles that are disc-like platelets of about 0.92 nm thickness and having a lateral dimension of about 25 nm. According to the manufacturer the laponite has a surface area of over 900 $m^2 \cdot g^{-1}$. 49.9 g of tungstic acid $H_2WO_4$ (92.7 wt. % $WO_3$, 0.2 mole W) and 23.5 g of nickel hydroxycarbonate $2NiCO_3*3Ni(OH)_2*4 H_2O$ (0.2 mole of Ni) were added to the laponite suspension while stirring. The mixture was stirred until the slurry became homogeneous. The suspension was heated to 90° C. and held at that temperature for a period of 20 hours, while stirring. The pH of the suspension measured 5.7. At the end of this time, the suspension was filtered. The resulting solid was dried at 90° C. overnight. X-ray diffraction of the resulting solid showed the typical features of the catalyst according to the invention, as shown in the top XRD pattern of FIG. 2.

Comparative Example C6 (Ni1W1+10 wt. % Actigel 208)

The procedure of Example E4 was repeated, except Actigel 208 was used instead of laponite. Actigel 208 is a high quality, purified, self-dispersing natural clay having rod-shaped particles that average a thickness of about 3 nm and a lateral dimension of about 2 microns. The X-ray pattern of the resulting solid is shown in the bottom XRD pattern of FIG. 2 and shows peaks characteristic of unreacted metal species rather than the characteristic pattern of the desired bulk metal particles.

The invention claimed is:

1. A process for preparing bulk metal oxide particles comprising the steps of combining in a reaction mixture (i) from about 0.5 wt. % to about 10 wt. % (relative to the total weight of the bulk metal particles) dispersible nanoparticles consisting essentially of laponite having a largest dimension of less than about 1 μm upon being dispersed in a liquid, (ii) at least one Group VIII non-noble metal compound, (iii) at least one Group VIB metal compound, and (iv) a protic liquid; and reacting the at least one Group VIII non-noble metal compound and the at least one Group VIB metal in the presence of the nanoparticles, wherein said nanoparticles are different in composition from said at least one Group VIII non-noble metal compound and said at least one Group VIB metal compound, (v) compositing the bulk metal oxide particles with a binder material having a dimension of greater than about 1 μm.

2. The process according to claim 1, wherein at least one Group VIII non-noble metal compound and at least two Group VIB metal compounds are combined in the reaction mixture.

3. The process according to claim 1, wherein the reaction mixture further comprises a Group V metal compound.

4. The process according to claim 1, wherein the metal compounds are at least partly in the solid state during the process.

5. The process according to claim 1, wherein the nanoparticles are added to the reaction mixture after the metal compounds.

6. The process according to claim 4, wherein the reaction mixture is prepared by:
   a) preparing a first suspension of at least one Group VIII non-noble metal compounds in a protic liquid;
   b) preparing a second suspension of at least one Group VIB metal compounds in a protic liquid, and
   c) combining the first and second suspensions together, wherein either the first, second, or both suspensions contain from about 0.5 wt. % to about 10 wt. % (relative to the total weight of the bulk metal particles) nanoparticles and wherein said nanoparticles are different in composition from said at least one Group VIII non-noble metal compound and said at least one Group VIB metal compound.

7. The process according to claim 6, wherein the at least one Group VIII non-noble metal compound comprises nickel (hydroxy) carbonate precipitated in the presence of nanoparticles.

8. A bulk catalyst composition comprising bulk metal oxide, sulfide, or a combination of oxide and sulfide particles having (i) from about 0.5 wt. % to about 10 wt. % (relative to the total weight of the bulk metal particles) dispersible nanoparticles consisting essentially of laponite having a largest dimension of less than about 1 µm upon dispersion in a liquid, (ii) at least one Group VIII non-noble metal compound, and (iii) at least one Group VIB metal compound, obtainable by the process according to any one of claims 1 to 7 wherein said nanoparticles are different in composition from said at least one Group VIII non-noble metal compound and said at least one Group VIB metal compound.

9. A bulk catalyst composition comprising bulk metal oxide, sulfide, or a combination of oxide and sulfide particles comprising (i) from about 0.5 wt. % to about 10 wt. % (relative to the total weight of the bulk metal particles) dispersible nanoparticles consisting essentially of laponite having a largest dimension of less than about 1 µm upon dispersion in a liquid, (ii) at least one Group VIII non-noble metal compound, and (iii) at least one Group VIB metal compound, wherein the bulk metal oxide particles are prepared by combining in a reaction mixture the nanoparticles, at least one Group VIII non-noble metal compound, at least one Group VIB metal compound, and a protic liquid, and reacting the at least one Group VIII non-noble metal compound and the at least one Group VIB metal compound in the presence of the nanoparticles, wherein said nanoparticles are different in composition from said at least one Group VIII non-noble metal compound and said at least one Group VIB metal compound.

10. A bulk catalyst composition comprising bulk metal oxide and/or sulfide particles, wherein the bulk metal particles comprise:
from about 50 wt. % to about 99.5 wt. % (calculated as metal oxide weight relative to the total weight of the bulk metal oxide and/or sulfide catalyst particles) of at least one Group VIII non-noble metal and at least one Group VIB metal, the metals being the form of oxides and/or sulfides, and
from about 0.5 wt. % to about 10 wt. % (relative to the total weight of the bulk metal particles) of nanoparticles consisting essentially of laponite having a largest dimension of less than 1 µm upon dispersion in a liquid, wherein said nanoparticles are different in composition from said at least one Group VIII non-noble metal compound and said at least one Group VIB metal compound.

11. The bulk catalyst composition of claim 10, wherein the at least one Group VIII non-noble metal is cobalt and/or nickel.

12. The bulk catalyst composition of claim 11, wherein nickel and/or cobalt represent at least about 90 wt. %, calculated as oxide, of the total of the Group VIII non-noble metals.

13. The bulk catalyst composition according to claim 10, wherein the at least one Group VIB metal is molybdenum and/or tungsten.

14. The bulk catalyst composition according to claim 10, wherein the only Group VIII non-noble metal is nickel and the only Group VIB metal is tungsten.

15. The bulk catalyst composition of claim 10, wherein the bulk metal oxide and/or sulfide particles comprise molybdenum and tungsten, and wherein the molar ratio of molybdenum:tungsten is in the range from about 3:1 to about 1:6.

16. The bulk catalyst composition according to claim 10, characterized by a molar ratio of Group VIB metals to Group VIII non-noble metals in the range from about 3:1 to about 1:3.

17. The bulk catalyst composition according to claim 10, further comprising a Group V metal.

18. The bulk catalyst composition of claim 17, wherein the molar ratio of Group V metals to Group VIB metals is between about 0.01 and about 5.

\* \* \* \* \*